United States Patent
Fujii et al.

(10) Patent No.: US 10,041,783 B2
(45) Date of Patent: Aug. 7, 2018

(54) THREE-DIMENSIONAL SHAPE MEASUREMENT APPARATUS

(71) Applicant: OLYMPUS CORPORATION, Shibuya-ku, Tokyo (JP)

(72) Inventors: Akihiro Fujii, Tokyo (JP); Yosuke Tani, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 248 days.

(21) Appl. No.: 15/057,943

(22) Filed: Mar. 1, 2016

(65) Prior Publication Data
US 2016/0275689 A1   Sep. 22, 2016

(30) Foreign Application Priority Data
Mar. 17, 2015  (JP) ................................ 2015-053192

(51) Int. Cl.
*G01B 11/02*   (2006.01)
*G01B 11/22*   (2006.01)
*G01B 11/24*   (2006.01)
*G06T 7/00*    (2017.01)
*G06T 7/571*   (2017.01)

(52) U.S. Cl.
CPC .............. *G01B 11/02* (2013.01); *G01B 11/24* (2013.01); *G06T 7/0004* (2013.01); *G06T 7/571* (2017.01); *G06T 2207/10028* (2013.01); *G06T 2207/10056* (2013.01)

(58) Field of Classification Search
USPC ................................................ 382/128, 154
See application file for complete search history.

(56) References Cited

U.S. PATENT DOCUMENTS

| | | | | | |
|---|---|---|---|---|---|
| 5,381,360 | A | * | 1/1995 | Shridhar | G06F 5/10 708/491 |
| 5,841,894 | A | * | 11/1998 | Horie | G01B 11/24 382/154 |
| 6,031,661 | A | * | 2/2000 | Tanaami | G01B 11/24 356/613 |
| 7,205,519 | B2 | * | 4/2007 | Ishida | G02B 21/0044 250/201.2 |
| 7,511,828 | B2 | * | 3/2009 | Watanabe | G01B 11/24 356/601 |

(Continued)

FOREIGN PATENT DOCUMENTS

| | | |
|---|---|---|
| JP | 11148811 A | 6/1999 |
| JP | 3847422 B2 | 11/2006 |
| JP | 3960862 B2 | 8/2007 |

*Primary Examiner* — Ishrat I Sherali
(74) *Attorney, Agent, or Firm* — Holtz, Holtz & Volek PC

(57) ABSTRACT

A technology is provided that makes it possible for even a beginner to determine whether a measurement result is correct, to thereby prevent the use of incorrect measurement data, and to improve the reliability of an analysis result. In a three-dimensional shape measurement apparatus 100 that measures a three-dimensional shape of a specimen 3 in a non-contacting manner, a score that evaluates the reliability of measurement data is calculated for each measurement point by use of information obtained during a process of estimating the height of the specimen 3 or the estimated height. Measurement data is processed according to a result of evaluating the measurement data for each measurement point by use of the score.

9 Claims, 24 Drawing Sheets

(56) References Cited

U.S. PATENT DOCUMENTS

| | | | | |
|---|---|---|---|---|
| 7,630,538 | B2* | 12/2009 | Nishiyama | G02B 21/0024 |
| | | | | 359/368 |
| 7,715,020 | B2* | 5/2010 | Yamaguchi | G01B 11/2518 |
| | | | | 356/601 |
| 7,812,969 | B2* | 10/2010 | Morimoto | G01B 11/2545 |
| | | | | 356/601 |
| 8,482,733 | B2* | 7/2013 | Model | G01N 21/59 |
| | | | | 250/428 |
| 9,097,514 | B2* | 8/2015 | Takahashi | G01B 11/0608 |
| 9,355,453 | B2* | 5/2016 | Watanabe | G06T 7/75 |
| 2005/0024718 | A1 | 2/2005 | Sase et al. | |
| 2015/0362310 | A1* | 12/2015 | Taniguchi | G01B 21/047 |
| | | | | 356/4.01 |

* cited by examiner

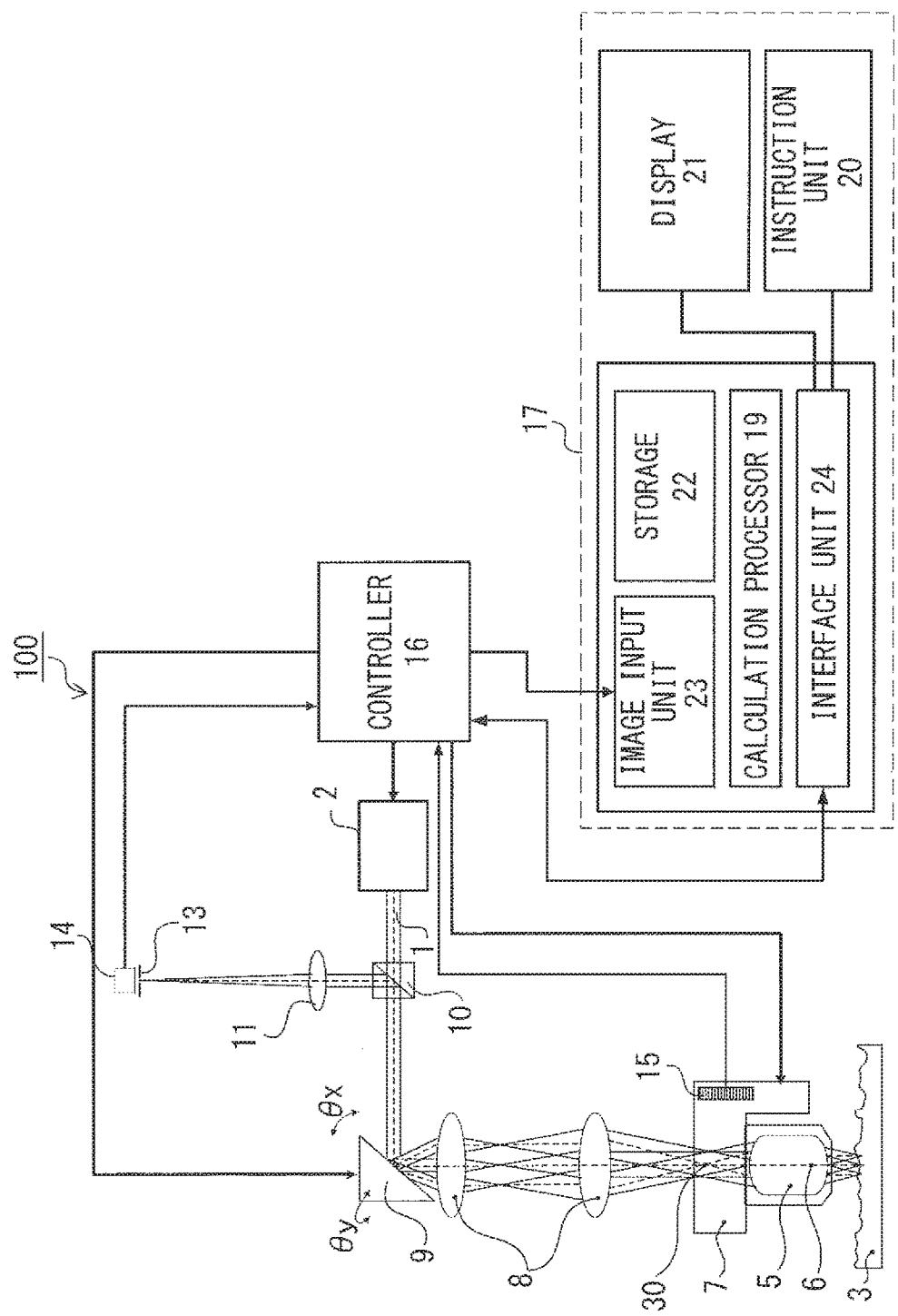
F I G. 1

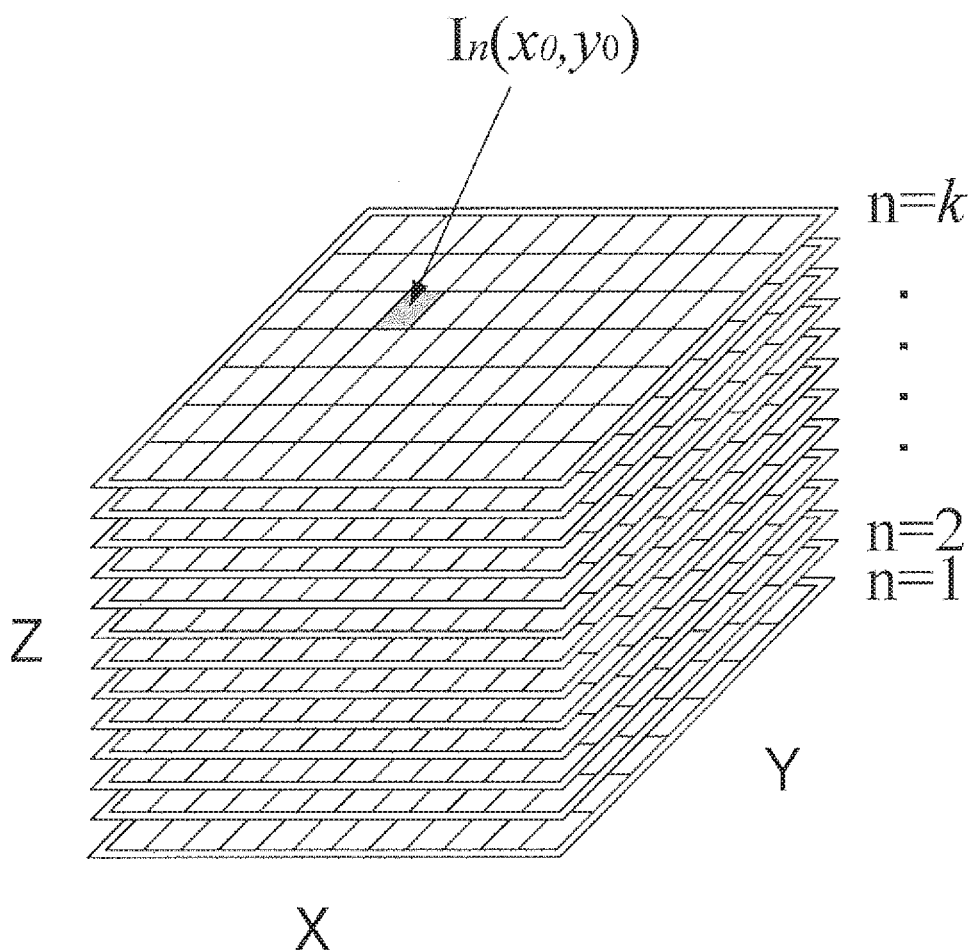
F I G. 2

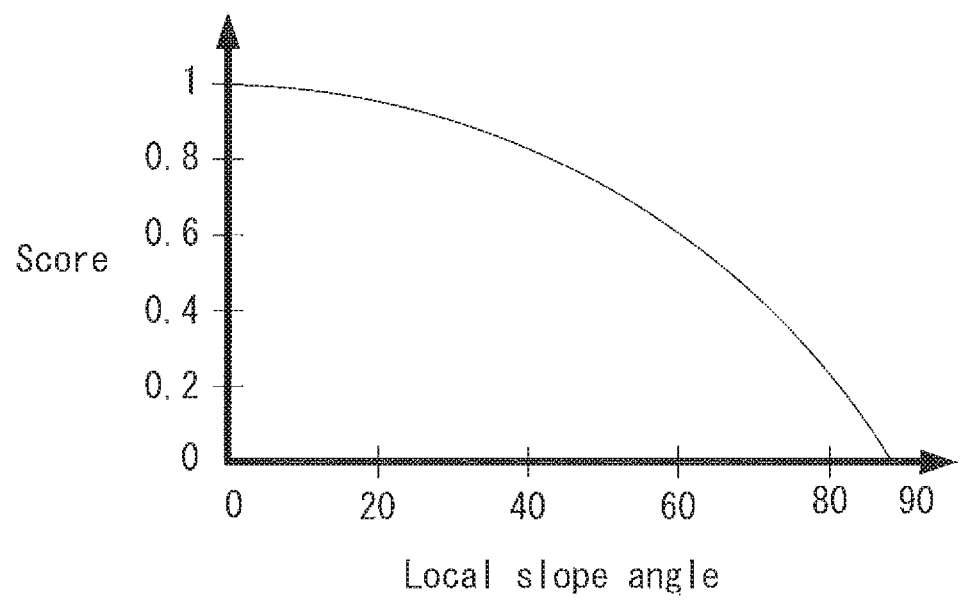
F I G. 9 C

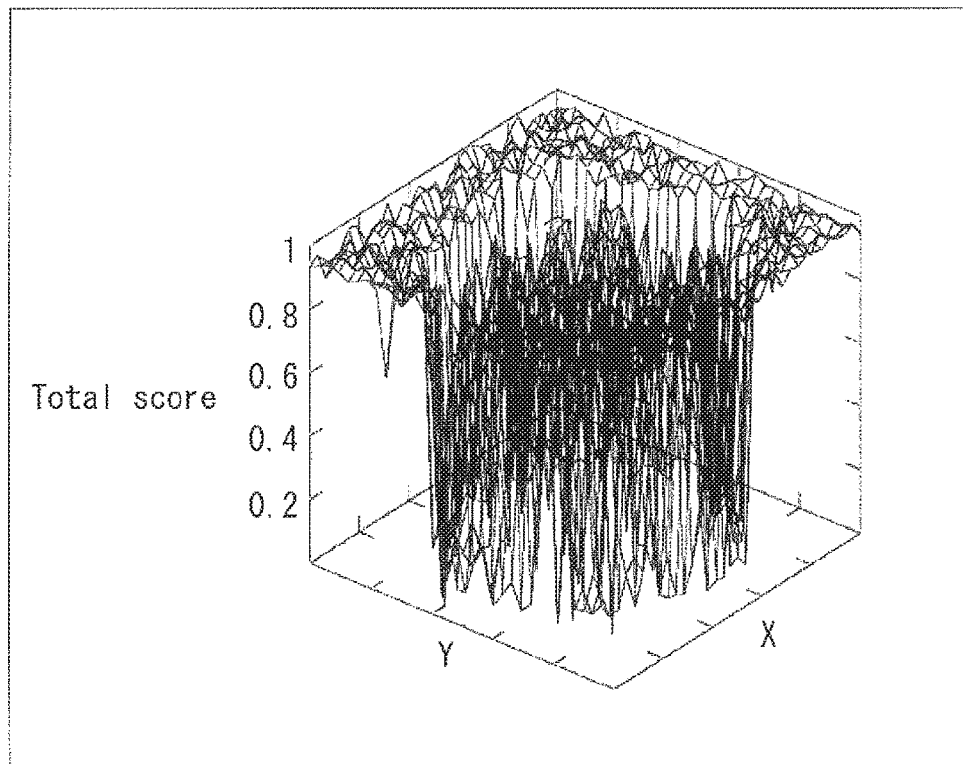
F I G. 10

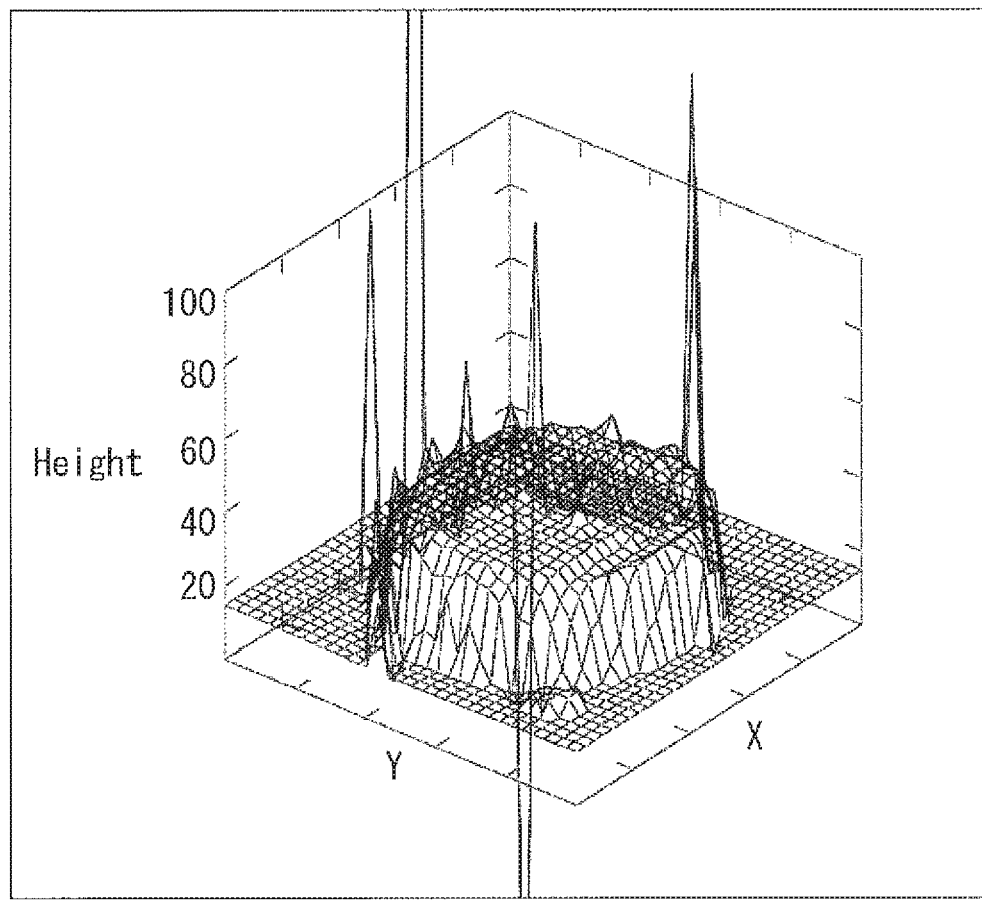
THRESHOLD=0.02
F I G. 1 1 A

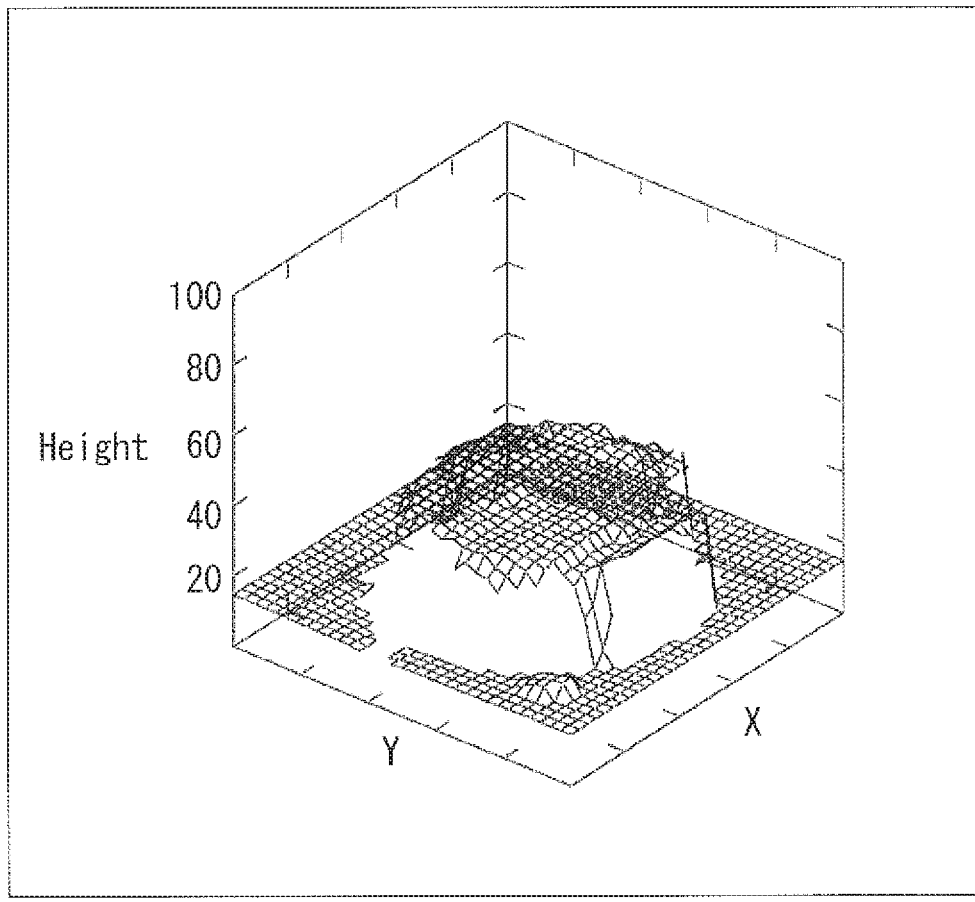
THRESHOLD=0.16
F I G. 11C

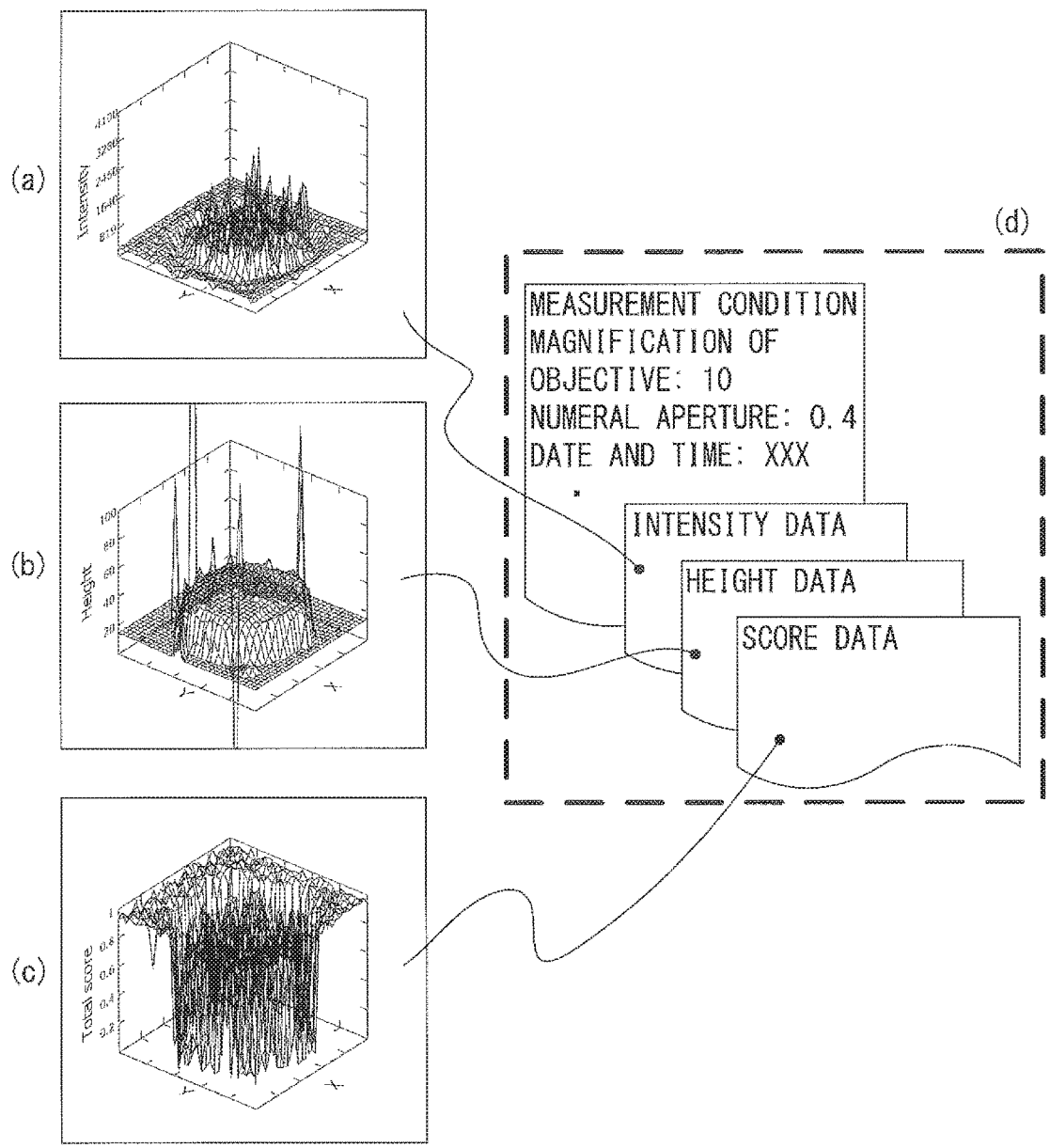
F I G. 1 2

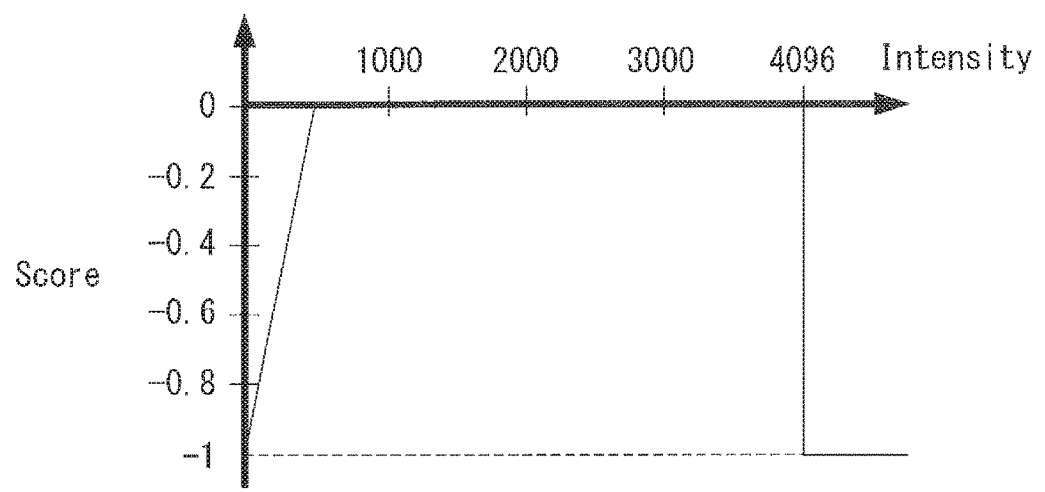
F I G. 13 A

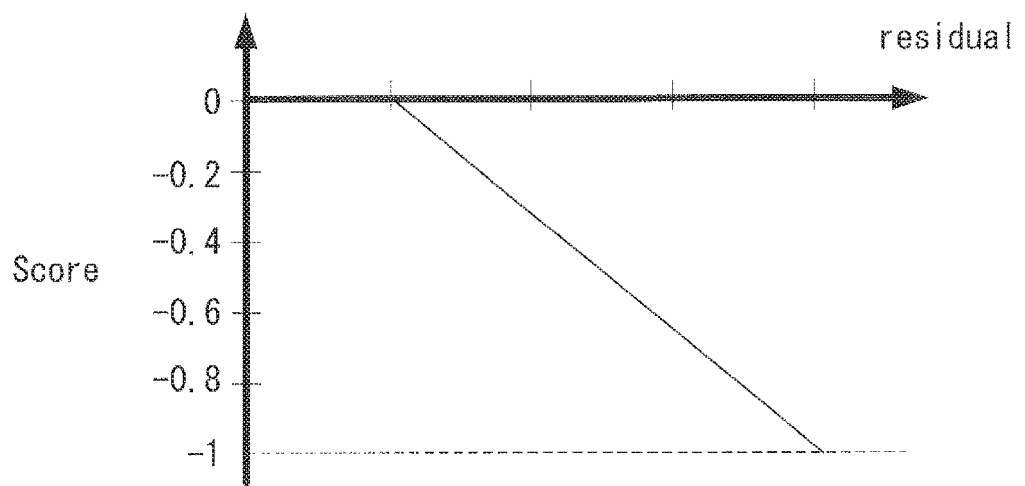
F I G. 1 3 C

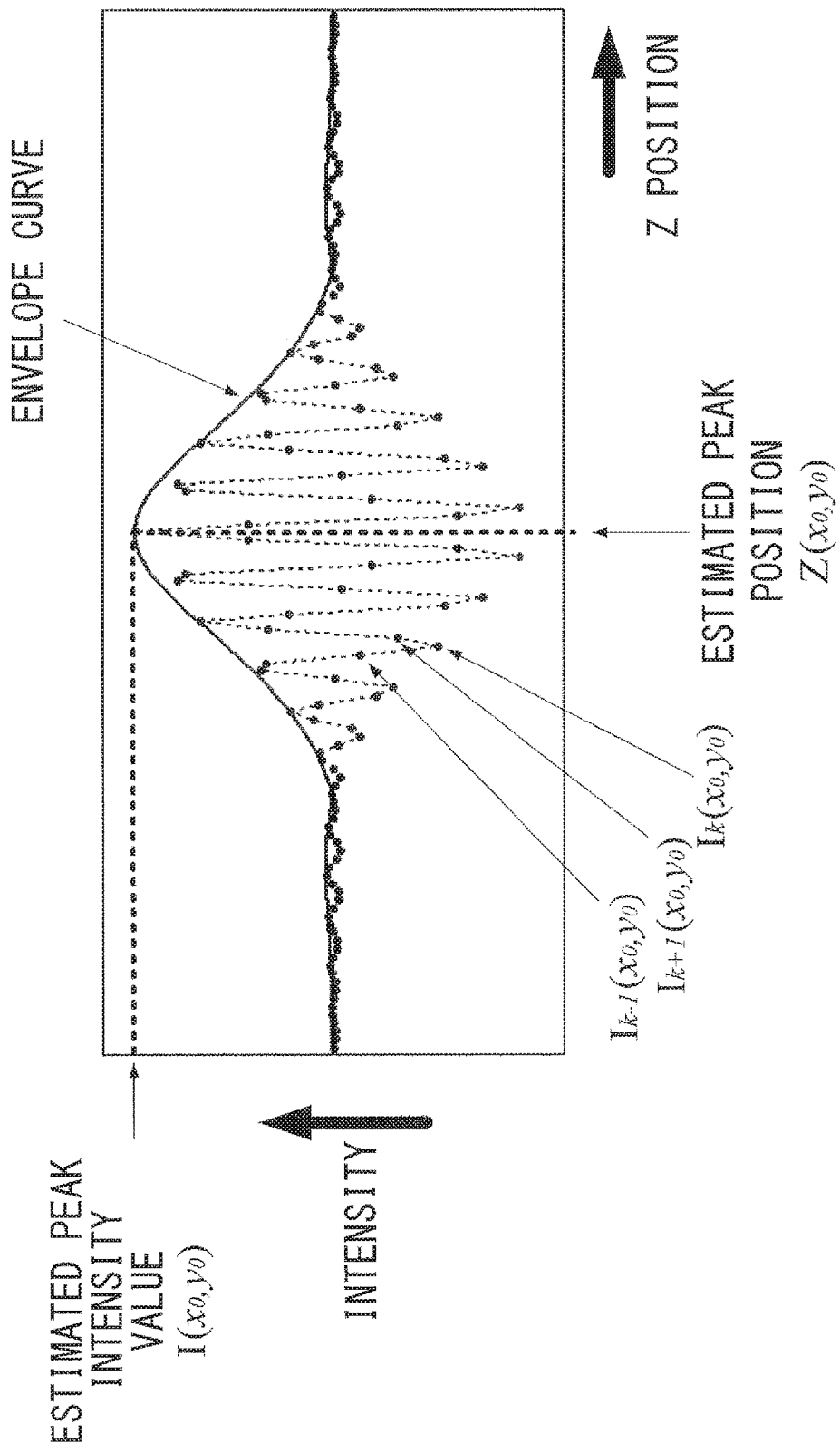
F I G. 14

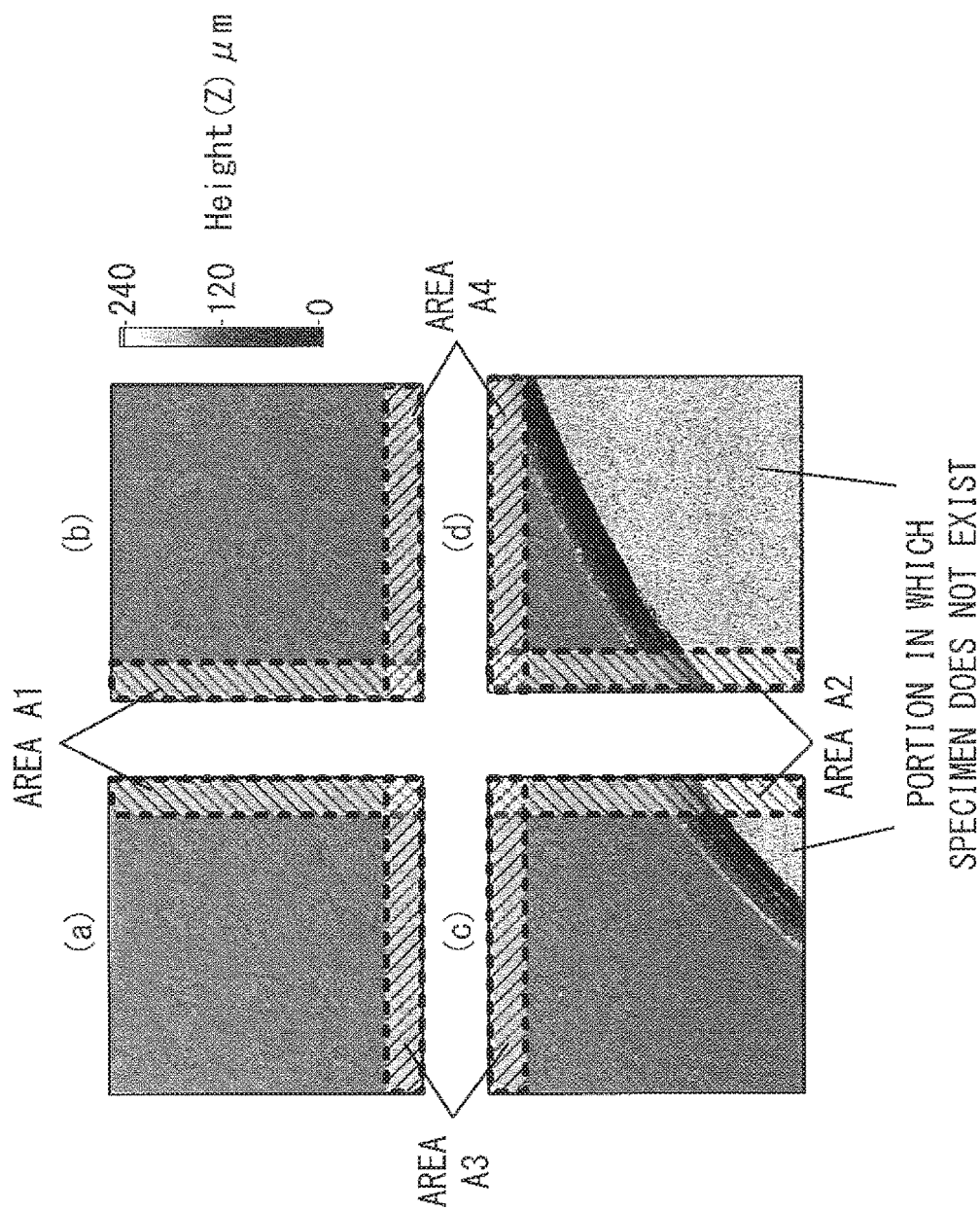
F I G. 15

THREE-DIMENSIONAL SHAPE MEASUREMENT APPARATUS

CROSS REFERENCE TO RELATED APPLICATION

This application is based upon and claims the benefit of priority from the prior Japanese patent Application No. 2015-053192, filed Mar. 17, 2015, the entire contents of which are incorporated herein by reference.

BACKGROUND OF THE INVENTION

Field of the Invention

This invention relates to a three-dimensional shape measurement apparatus that measures a three-dimensional shape of a specimen in a non-contacting manner.

Description of the Related Art

In order to make industrial products smaller and more advanced, the functionality of a surface of a component is important. For example, a surface of a cylinder of an automotive engine is provided with intentional microasperity for controlling sliding resistance, which results in improving energy efficiency and increasing longevity. In the field of dental implants, features adaptive to a living body are managed not only on the basis of materials but also on the basis of roughness of surface (surface texture).

Further, in addition to these functional and biological features, various functions including an electrical function such as contact resistance of an electrical contact, an optical function such as a reflection and scattering, and a surface function related to a design factor such as appearance have been required for a component.

Needless to say, in order to control the quality of the surface function, it is important to correctly measure a geometric shape of a surface of a component for quantification.

As one of the methods for measuring a geometric shape of a surface of a component, a stylus surface roughness meter disclosed in Industrial Standard ISO3274:1996 set by the International Organization for Standardization (ISO) (for the Japanese version, see B0651:2001, Japanese Industrial Standards (JIS)) has long been used. This method permits obtaining of highly reliable data because a solid surface of an object to be measured is accurately traced with a mechanical stylus tip.

On the other hand, non-contacting measurement apparatuses that employ various measurement principles have also been widely used. The non-contacting measurement apparatuses have been rapidly spread in recent years because they can easily perform measurement without scratching an object to be measured. Typical non-contacting measurement apparatuses are classified in the Industrial Standard ISO25178-6:2010 (for the Japanese version, see B0681-6:2014, JIS) by putting the standard in place, so it is understood that they have started being widely used in industry.

Many of the non-contacting measurement apparatuses employ an optical approach. For example, as disclosed in Japanese Patent No. 3960862 and Japanese Patent No. 3847422, a measurement apparatus that employs confocal microscopy or coherence scanning interferometry is a typical example of the non-contacting measurement apparatuses available in the market.

In addition to the measurement apparatuses described above, there exist various non-contacting optical measurement apparatuses. Further, even for measurement apparatuses employing the same measurement principle, there exist a plurality of measurement conditions depending on, for example, the magnification of an objective. The measurement performance and the limit of measurement depend on the used measurement apparatus or the used measurement conditions. In this way, it is greatly industrially advantageous if an appropriate measurement apparatus can be selected from among various types of measurement apparatuses according to the measurement purpose, that is, the measurement accuracy, the size of an area to be measured, or the cycle time.

On the other hand, when a measurement apparatus or a measurement condition is not optimally selected, an incorrect measurement result may be output by erroneously detecting, for example, noise if measurement is performed in an area in which the limit of measurement is exceeded. In order to obtain a correct measurement result, it is necessary to recognize that there exists incorrect measurement data, which requires plenty of experience and skill in using a measurement apparatus. There is a possibility that a correct measurement result will not be obtained and then a correct analysis will not be performed because the existence of incorrect measurement data is not recognized.

SUMMARY OF THE INVENTION

In one aspect, an object of the present invention is to provide a three-dimensional shape measurement apparatus that measures a three-dimensional shape of a specimen in a non-contacting manner, the three-dimensional shape measurement apparatus including a score calculator that calculates a score for evaluating the reliability of measurement data for each measurement point by use of information obtained during a process of estimating a height of the specimen or the estimated height, and a data processor that processes the measurement data according to a result of evaluating the measurement data for each of the measurement points by use of the score.

BRIEF DESCRIPTION OF THE DRAWINGS

The present invention will be more apparent from the following detailed description when the accompanying drawings are referenced.

FIG. 1 is a diagram that illustrates a configuration of a three-dimensional shape measurement apparatus according to a first embodiment of the present invention;

FIG. 2 illustrates a plurality of images obtained by performing a Z-scanning;

FIG. 9C is a diagram for explaining the method for calculating a score on the basis of an estimated height;

FIG. 10 is a diagram for explaining a method for evaluating measurement data by use of a plurality of scores;

FIG. 11A is a bird's eye view of a height data distribution when invalidating less reliable data on the basis of a calculated total score;

FIG. 11C is a bird's eye view of a height data distribution when invalidating less reliable data on the basis of a calculated total score;

FIG. 12 is a set of diagrams that illustrate a configuration of data managed by the three-dimensional shape measurement apparatus according to the first embodiment;

FIG. 13A illustrates a value to be assigned to each score calculating table according to a modification;

FIG. 13C illustrates the value to be assigned to each score calculating table according to the modification;

FIG. 14 is a diagram for explaining a method for estimating a peak intensity value and a Z position in a measurement point by the coherence scanning interferometry;

FIG. 15 illustrates an estimated image of height obtained by measuring a three-dimensional shape;

DESCRIPTION OF THE PREFERRED EMBODIMENTS

Figure 3:
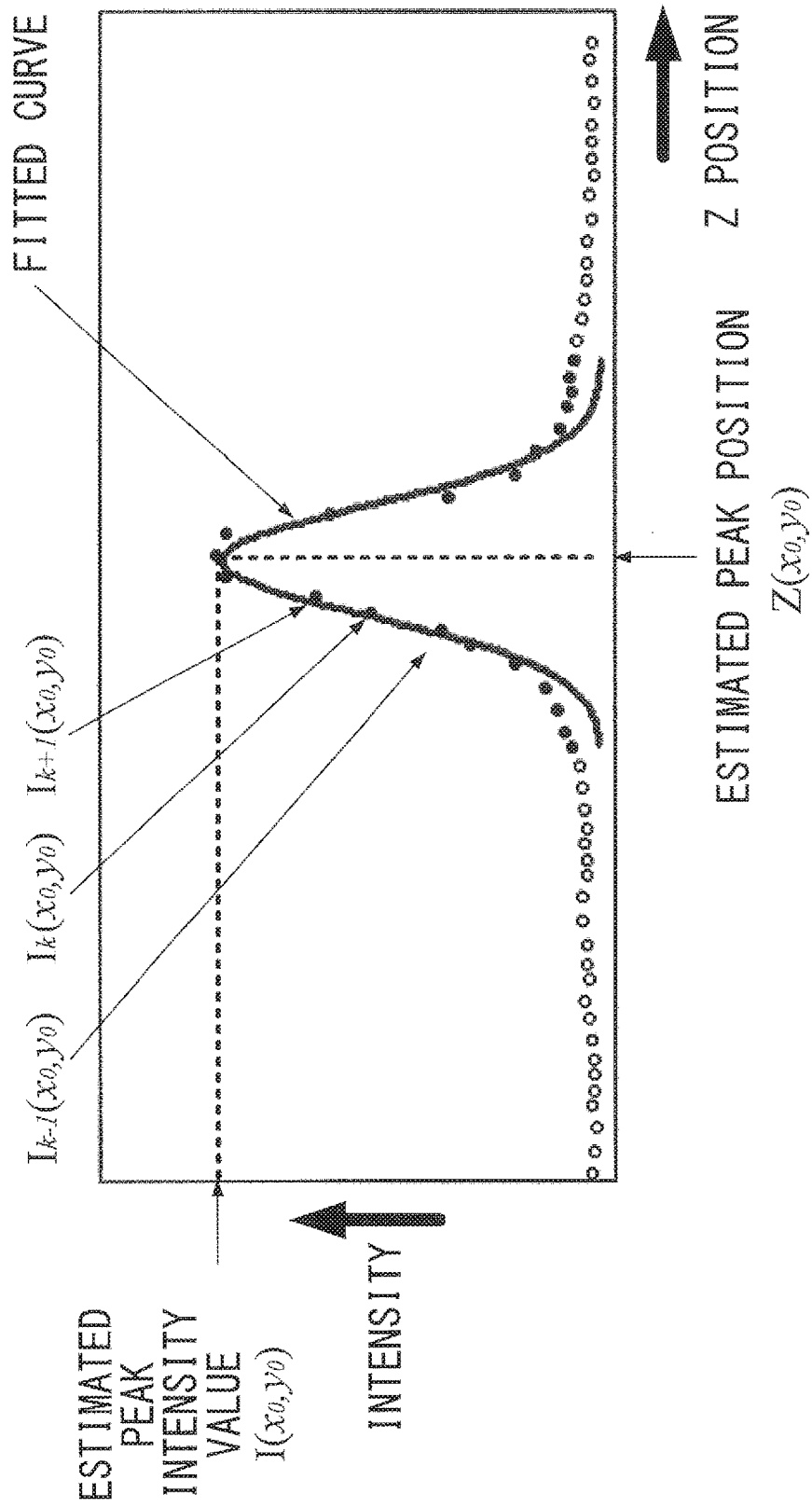
FIG. 3 illustrates a change in intensity at a certain point in k images.

Embodiments of the present invention will now be described in detail with reference to the drawings.
<First Embodiment>
(Configuration)

FIG. 1 is a diagram that illustrates a configuration of a three-dimensional shape measurement apparatus according to a first embodiment of the present invention. A three-dimensional shape measurement apparatus 100 of FIG. 1 is constituted of a confocal microscope, is connected to a computer 17, and measures a three-dimensional shape of a specimen 3 in a non-contacting manner.

A laser source 2 emits a collimated beam 1. A two-dimensional light deflector 9 can independently change a direction of a reflective surface of the collimated beam 1. The two-dimensional light deflector 9 changes its deflection angles θx and θy in response to a deflection timing instruction from a controller 16 that will be described below. FIG. 1 only illustrates light deflected in a θx direction as a beam.

A projection lens 8 magnifies and projects the diameter of the collimated beam 1 reflected by the two-dimensional light deflector 9. An objective 5 is arranged such that a rear focal position 30 is around a focal position of the projection lens 8.

A beam splitter 10 is arranged between the laser source 2 and the two-dimensional light deflector 9. An imaging lens 11 is arranged on a reflective-light-path side of the beam splitter 10. A confocal aperture 13 and a photodetector 14 are arranged at a focal position of the imaging lens 11. For example, a photomultiplier or an avalanche photodiode is used as the photodetector 14.

The objective 5 is fixed on a Z-scanning stage 7 that is movable in a direction parallel with an optical axis 6. The Z-scanning stage 7 is provided with a displacement meter 15 for reading its moving distance. For example, an optical linear encoder or a capacitive displacement meter is used as the displacement meter 15.

The controller 16 receives an instruction from an instruction unit 20 connected to the computer 17, and gives a movement instruction to the Z-scanning stage 7 and the two-dimensional light deflector 9. Further, the controller 16 obtains an intensity value from a signal detected by the photodetector 14 and displacement from a signal detected by the displacement meter 15, and transmits information such as the obtained intensity value and displacement to the computer 17.

In addition to the instruction unit 20 described above, the computer 17 has a display 21, a storage 22, an image input unit 23, a calculation processor 19, and an interface unit 24.

The instruction unit 20 is input means such as a keyboard or a mouse, and receives an input of an instruction from a user. The storage 22 is storage means such as a hard disk or a memory, and stores therein various pieces of data related to the three-dimensional shape measurement according to the present embodiment and a program for evaluating the reliability of three-dimensional shape measurement and measurement data. The image input unit 23 receives an input of microscope image data through the controller 16. The interface unit 24 is an interface that is used for communicating various pieces of data or a content of an instruction with the controller 16. The calculation processor 19 is constituted of, for example, a CPU, and performs various calculations. For example, the calculation processor19 reads the program stored in the storage 22 and performs various processes such as a calculation of a score for evaluating the reliability of data on three-dimensional shape measurement.
(Principle of Confocal Microscope)

First, a principle of an operation for obtaining a confocal microscope image according to the confocal microscope 100 having a configuration illustrated in FIG. 1 will be described.

The collimated beam 1 emitted from the laser source 2 is transmitted through the beam splitter 10 and reflected onto the two-dimensional light deflector 9. The deflected beam is magnified by the projection lens 8 and enters the objective 5 through the rear focal position 30 of the objective 5. The beam entering the objective 5 illuminates a single spot on the specimen 3. The spot-shaped light is raster scanned by the two-dimensional light deflector 9 over the specimen 3.

The beam reflected onto the specimen 3 passes through the objective 5 to the projection lens 8 again, is reflected onto the two-dimensional light deflector 9, and is then reflected onto the beam splitter 10. The beam reflected onto the beam splitter 10 is then collected in the imaging lens 11, and enters the confocal aperture 13. Only a beam that has been able to pass through the confocal aperture 13 is received by the photodetector 14 and detected as an intensity value. Only a reflected beam coming from a focused position is able to pass through the confocal aperture 13.

The controller 16 two-dimensionally maps an intensity value obtained for each position with which a spot-shaped light is irradiated, so as to generate a confocal microscope image. The controller 16 transmits the generated confocal microscope image to the image input unit 23 of the computer 17. The computer 17 displays the received confocal microscope image on the display 21.

(Basic Principle of Height Measurement)

Next, a principle of an operation for height measurement according to the confocal microscope apparatus of FIG. 1 will be described.

According to a control performed by the controller 16, the three-dimensional shape measurement apparatus 100 changes the relative distance between the objective 5 and the specimen 3 by moving the Z-scanning stage 7, so as to obtain a plurality of confocal microscope images. This operation is hereinafter referred to as a Z-scanning. FIG. 2 illustrates a plurality of images obtained by performing a Z-scanning. The images in series are stored in the storage 22 of the computer 17 every time an image is obtained. Each image is numbered as n=1, 2, . . . , k (where k is a natural number) according to the relative distance between the objective 5 and the specimen 3, and is stored.

With respect to a certain point (x0, y0) on the specimen 3, intensity at this point changes discretely. FIG. 3 illustrates a change in intensity at the point (x0, y0) in k images when n=1, . . . , k. The change in intensity has a shape largely dictated by, for example, a numerical aperture of the objective 5, a wavelength of the laser source 2, and the size of an aperture of the confocal aperture 13.

With respect to an image n in which an intensity value at the point (x0, y0) reaches a peak and images in its vicinity, the calculation processor 19 extracts, from pieces of image data on the images stored in the storage 22, several points to dozens of points, and calculates an approximated curve using the extracted pieces of data. In the example of FIG. 3, the approximated curve is calculated by use of twenty-one points represented by solid black and forming a plot. A second-order polynomial, or even a higher order polynomial, and a Gaussian curve are examples of the types of approximated curves to be used, and a least-square method is representative of an approximate method, but any curve approximating method may be used if it is known.

The calculation processor 19 estimates a peak intensity value I (x0, y0) and a corresponding Z position Z (x0, y0) from an approximated curve obtained by such a known method. The estimated Z position Z (x0, y0) is a value of height at the position (x0, y0) on the specimen 3, and a relative height distribution of the specimen 3 is obtained by calculating the estimated value at all (x, y) points (with respect to all measurement points, that is, all pixels).

In the following description, the peak intensity value I (x0, y0) and the Z position Z (x0, y0), that is, a height, that are obtained by performing an estimation by use of the above-described method are also referred to as measurement data.

Figure 4:
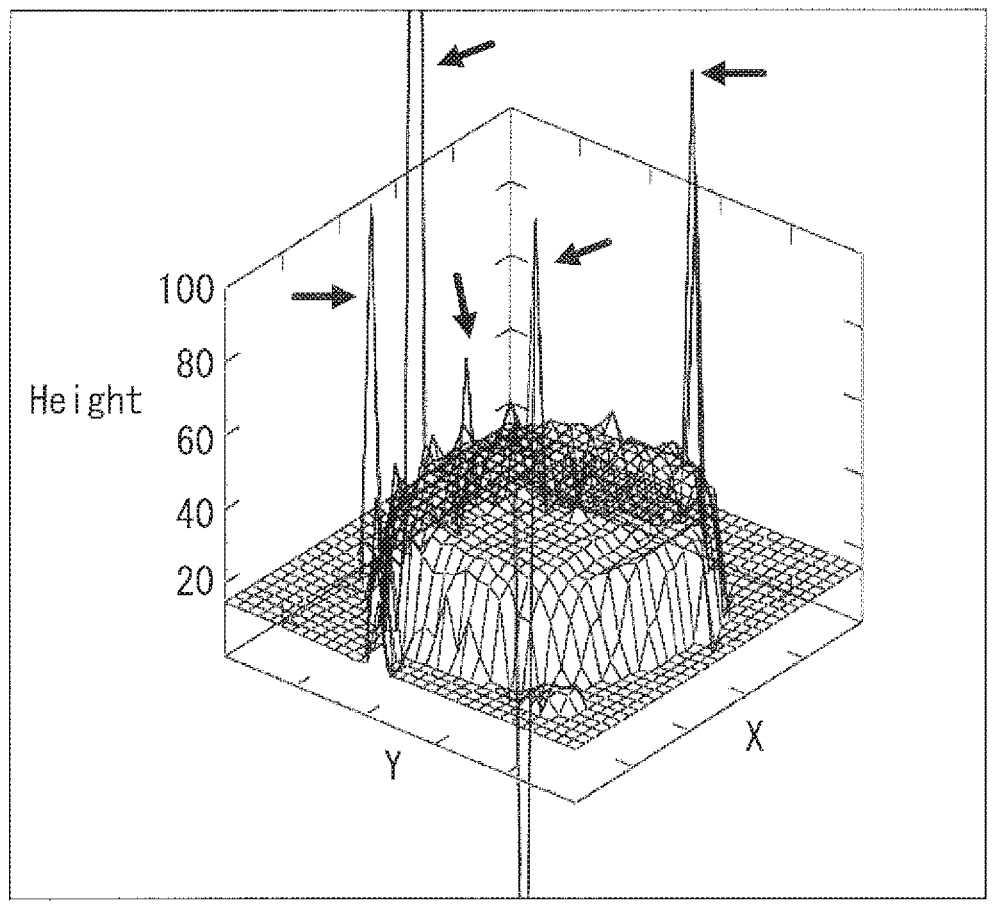
FIG. 4 illustrates a distribution of an estimated height.

FIG. 4 illustrates a distribution of an estimated height.

As a plurality of locations are indicated by arrows in FIG. 4, data on an estimated height may include a spiky measurement point. The reason is that height data obtained by the above-described method may include incorrect measurement data that has been detected erroneously, or measurement data in which there are doubts about the accuracy of the measurement. It is known that such data is created, for example, due to vibrations or undesired sounds in an installation environment, or due to noise included in the photodetector 14 or its amplifier circuit, or when a limit of optically detecting reflection light is exceeded.

Thus, in the calculation processor 19 of the three-dimensional shape measurement apparatus 100 according to the present embodiment, first, a score that indicates the reliability of measurement data for each measurement point, that is, for each pixel, is calculated in order to determine the measurement data having a lower reliability. For the types of scores, there is a score calculated by use of information obtained during a process of estimating a height and a score calculated by use of the estimated height.

(Calculation of Score for Determining Reliability of Measurement Data)

First, a method for calculating a score by use of information obtained during a process of estimating a height will be described.

Figure 5:
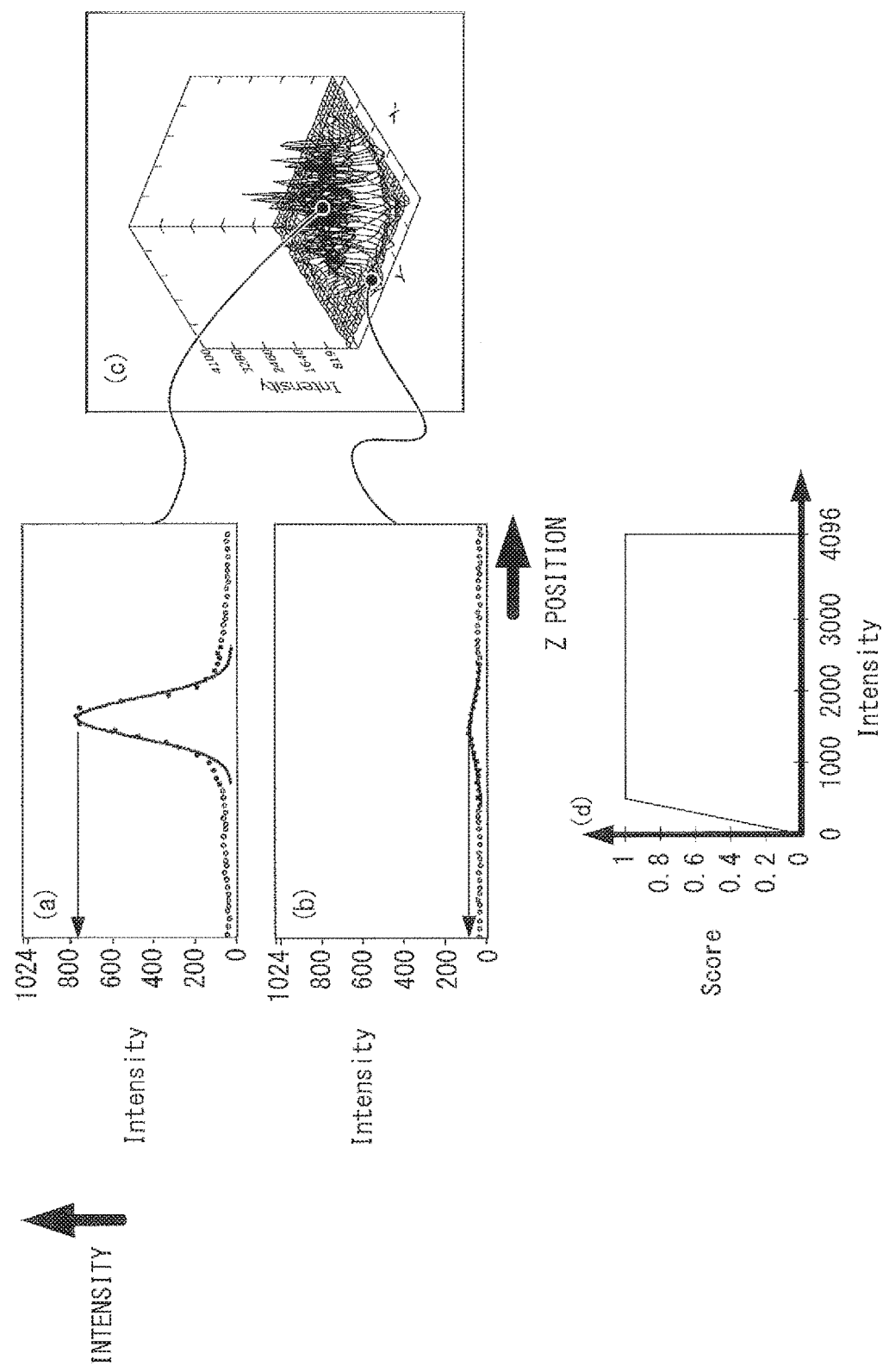
FIG. 5 is a set of diagrams for explaining a score calculated on the basis of an intensity value of a confocal microscope image.

FIG. 5 is a set of diagrams for explaining a score calculated on the basis of an intensity value of a confocal microscope image.

When performing a height estimation by use of an approximated curve as described above, as illustrated in FIG. 5(a), highly reliable measurement can be performed if there is sufficient intensity with respect to an intensity value. However, as illustrated in FIG. 5(b), if the intensity value is small (insufficient intensity), the reliability of measurement data is low because there is an influence of noise.

FIG. 5(c) illustrates an example of a bird's eye view representing a distribution of a peak intensity value I (x, y) obtained by performing an estimation. The distribution of a peak intensity value of FIG. 5(c) is intended for the same specimen 3 as the object for which the distribution of an estimated height of FIG. 4 is intended, and FIGS. 5(a) and 5(b) each illustrate a change in intensity in a specific position (pixel) in the distribution of a peak intensity value of FIG. 5(c).

As seen from the distribution of a peak intensity value I (x, y) illustrated in FIG. 5(c), an intensity value greatly varies depending on where the specimen 3 is positioned. Thus, in the present embodiment, measurement data is evaluated for each measurement point, that is, for each pixel, on the basis of the magnitude of an intensity value that is used during a process of estimating a height, by use of a score calculating table in which an intensity value is associated with its evaluation value.

FIG. 5(d) illustrates an example of a score calculating table of an intensity value. A score has a value greater than or equal to zero and less than or equal to one in the score calculating table of FIG. 5(d), and the table is set such that the score is decreased proportionally when the intensity value is less than or equal to a predetermined value (the gradation value is around five hundred in the illustrative example). When the intensity value is greater than or equal to the predetermined value, "one" is assigned as a score. The score obtained from a score distribution based on an intensity value is hereinafter referred to as an "intensity score" for convenience of description. The relationship between an intensity value and an intensity score in a score calculating table that is illustrated by example in FIG. 5(d) is stored in the storage 22 of FIG. 1 in advance.

However, when the intensity value is less than the predetermined value, the score calculating table of an intensity value may be set such that the score is relatively smaller compared with the scores in the other cases, and the score calculating table of an intensity value is not limited to the distribution of FIG. 5(d).

Figure 6:
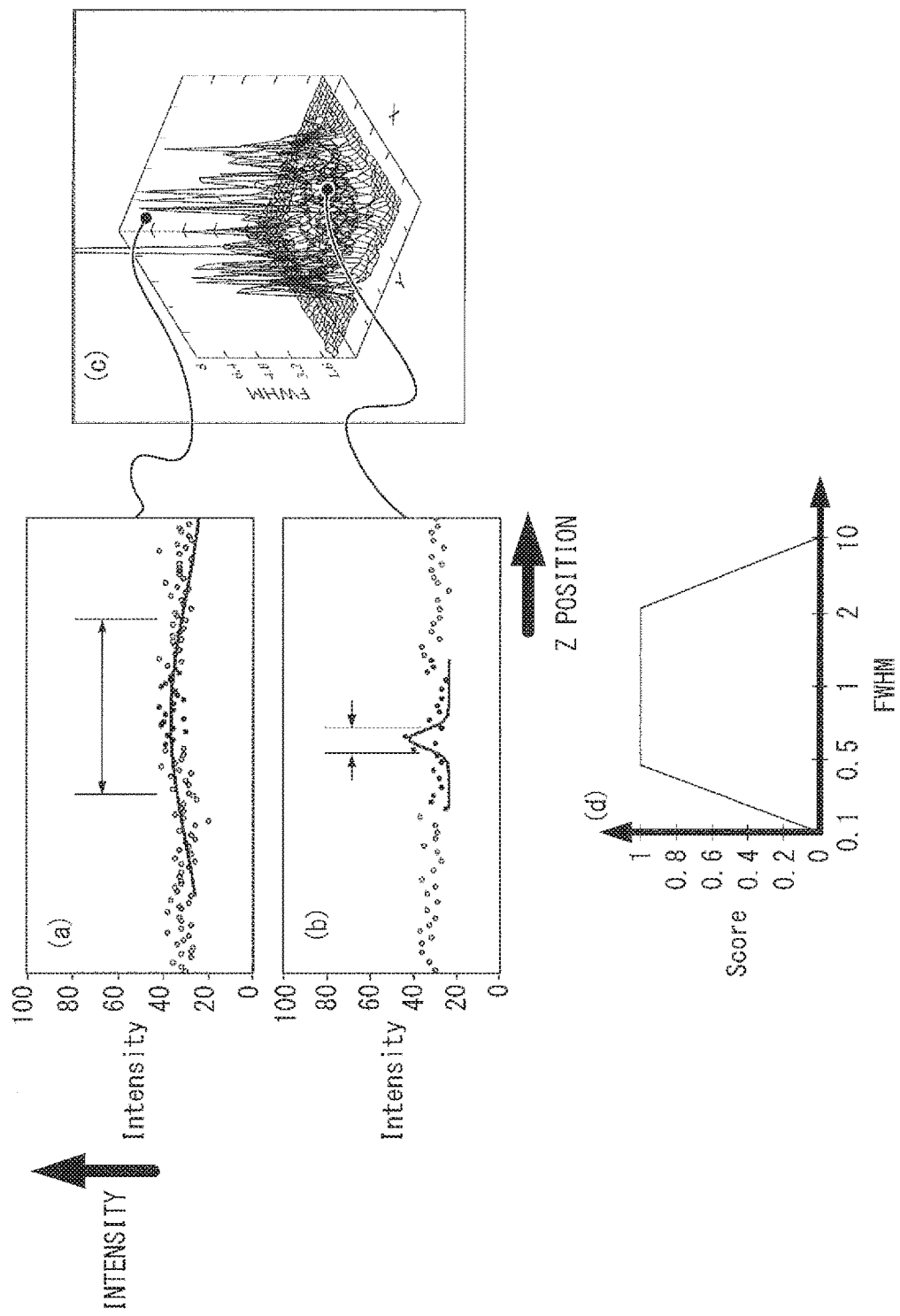
FIG. 6 is a set of diagrams for explaining a score calculated on the basis of a full width at half maximum of an approximated curve calculated from a change in intensity.

FIG. 6 is a set of diagrams for explaining a score calculated on the basis of a full width at half maximum of an approximated curve calculated from a change in intensity.

When the intensity value is small, as illustrated in FIGS. 6(a) and 6(b), a full width at half maximum (FWHM) of an approximated curve also may vary depending on the measurement position. In this case, as described above, approximated curves theoretically have the same shape on the same measurement conditions. However, in an actual measurement scene, the full width at half maximum varies depending on the measurement position, as illustrated in FIG. 6(c), because there is an influence of noise or the conditions of the surface of the specimen 3 (for example, the slope or the microfeatures having a resolution less than or equal to the optical resolution).

Thus, in the present embodiment, measurement data is also evaluated for each measurement point (pixel) by use of a score calculating table in which a full width at half maximum of an approximated curve is associated with its evaluation value. FIG. 6(d) illustrates an example of a score calculating table of a full width at half maximum. Also in the score calculating table of FIG. 6 (d), the score has a value greater than or equal to zero and less than or equal to one. The score calculating table is set such that the score is decreased proportionally when the full width at half maximum is more than twice or less than half its optical theory value (set to one in the illustrative example). If this is not the case, "one" is assigned as a score. The score obtained from a score distribution based on a full width at half maximum is hereinafter referred to as a "full-width-at-half-maximum score". The relationship between a full width at half maximum and a full-width-at-half-maximum score in a score calculating table that is illustrated by example in FIG. 6(d) is stored in the storage 22 of FIG. 1 in advance.

The score calculating table of a full width at half maximum is also not limited to the distribution illustrated in the figure, as is the case with the score calculating table of an intensity value. When the full width at half maximum is greater than or less than the predetermined value, the score calculating table may be set such that the score is relatively smaller compared with the scores in the other cases.

Figure 7:
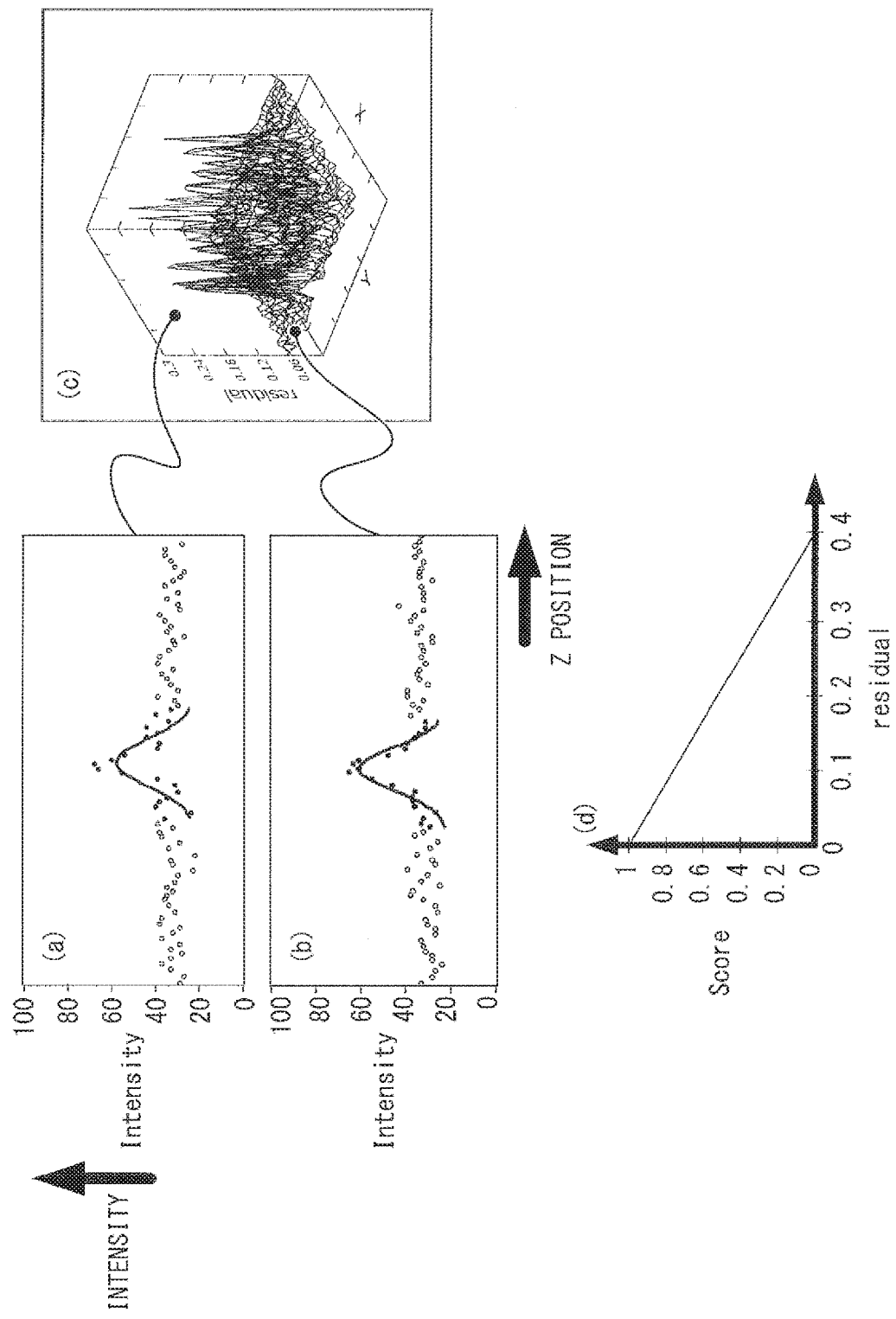
FIG. 7 is a set of diagrams for explaining a score calculated on the basis of a fitting residual of an approximated curve calculated from a change in intensity.

FIG. 7 is a set of diagrams for explaining a score calculated on the basis of a fitting residual of an approximated curve calculated from a change in intensity.

Not only the full width at half maximum of an approximated curve but also the fitting residual is affected by noise or the condition of the specimen 3. The fitting residual is a sum of squares of a difference between the approximated curve calculated from a change in intensity and an approximate point. FIGS. 7(a) and 7(b) each illustrate a fitting residual in a specific measurement point (pixel) in the distribution of a fitting residual in FIG. 7(c). In the two measurement positions illustrated in FIGS. 7(a) and 7(b), the levels of the maximum intensity value and the full width at half maximum are nearly the same, but the fitting residual of an approximated curve in FIG. 7(a) is obviously larger than that in FIG. 7(b).

As described above, like the intensity value and the full width at half maximum, the fitting residual has a value that varies depending on the measurement location. Thus, in the present embodiment, measurement data is evaluated for each measurement point by use of a score calculating table in which a fitting residual is associated with its evaluation value. Also in the score calculating table of FIG. 7 (d), the score has a value greater than or equal to zero and less than or equal to one, as is the case in the tables for an intensity score and for a full-width-at-half-maximum score described above. The score calculating table is set such that the score is "one" when the residual is zero and such that the score is decreased proportionally if the residual is larger. The score obtained from a score distribution based on a fitting residual is hereinafter referred to as a "residual score". The relationship between a fitting residual and a residual score in a score calculating table that is illustrated in FIG. 7(d) is stored in the storage 22 of FIG. 1 in advance.

The score calculating table of a fitting residual is also not limited to the score distribution illustrated in FIG. 7 (d), and it may be set such that the score is relatively larger if the residual is smaller and is relatively smaller if the residual is larger.

Figure 8:
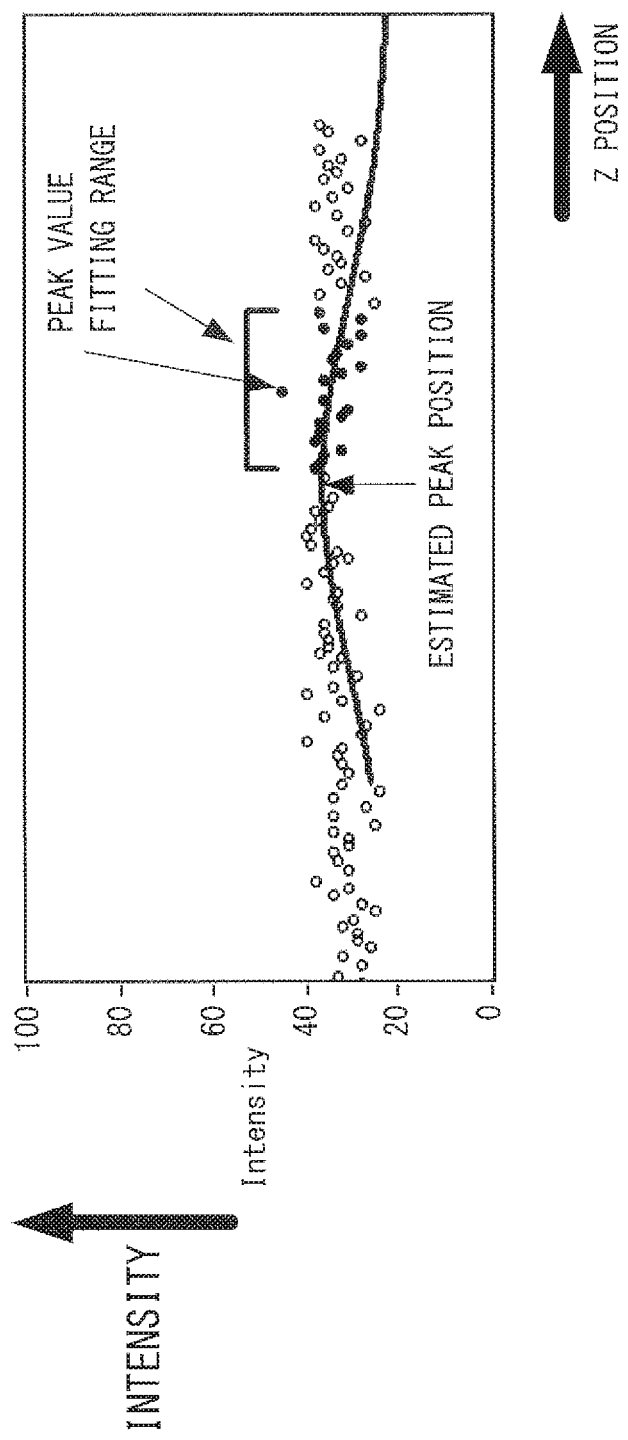
FIG. 8 is a diagram for explaining a score calculated on the basis of a peak position of an intensity value.

FIG. 8 is a diagram for explaining a score calculated on the basis of a peak position of an intensity value.

As described above with reference to FIG. 2, a predetermined data range is used for performing a fitting around a peak value when calculating a peak position of an intensity value. In FIG. 8, this data range is represented as a "fitting range". As illustrated in FIG. 8, when an estimated peak position is located outside the fitting range, the score is set to "zero" because the measurement is determined to be obviously incorrect. In cases other than this case, that is, when the peak position of an intensity value is included in the fitting range, the score is set to "one". The score obtained from a score distribution on the basis of a peak position that is obtained in this way is hereinafter referred to as a "peak position score".

The intensity score, the full-width-at-half-maximum score, the residual score, and the peak position score that have been described so far are calculated on the basis of information obtained during a process of estimating a height by performing a curve approximating. On the other hand, a score that will be described below is calculated on the basis of an estimated height.

Figure 9A:
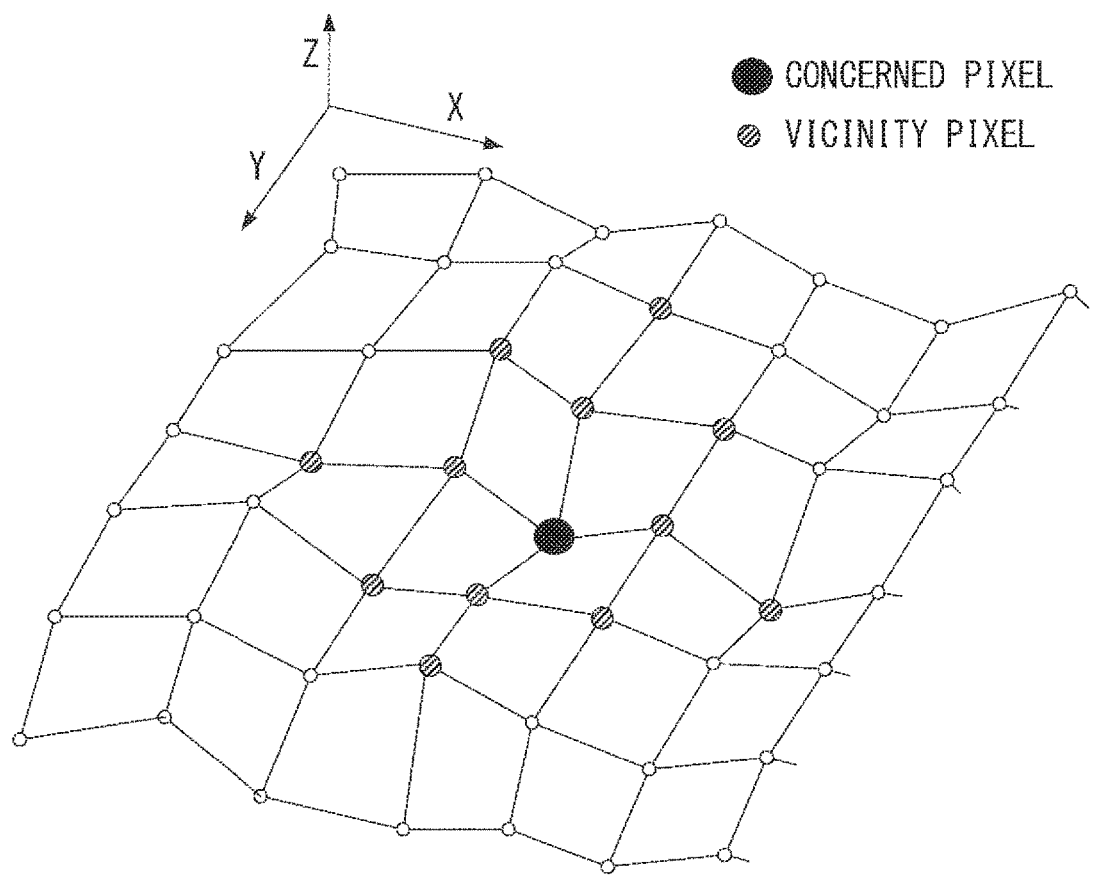
FIG. 9A is a diagram for explaining a method for calculating a score on the basis of an estimated height.
Figure 9B:
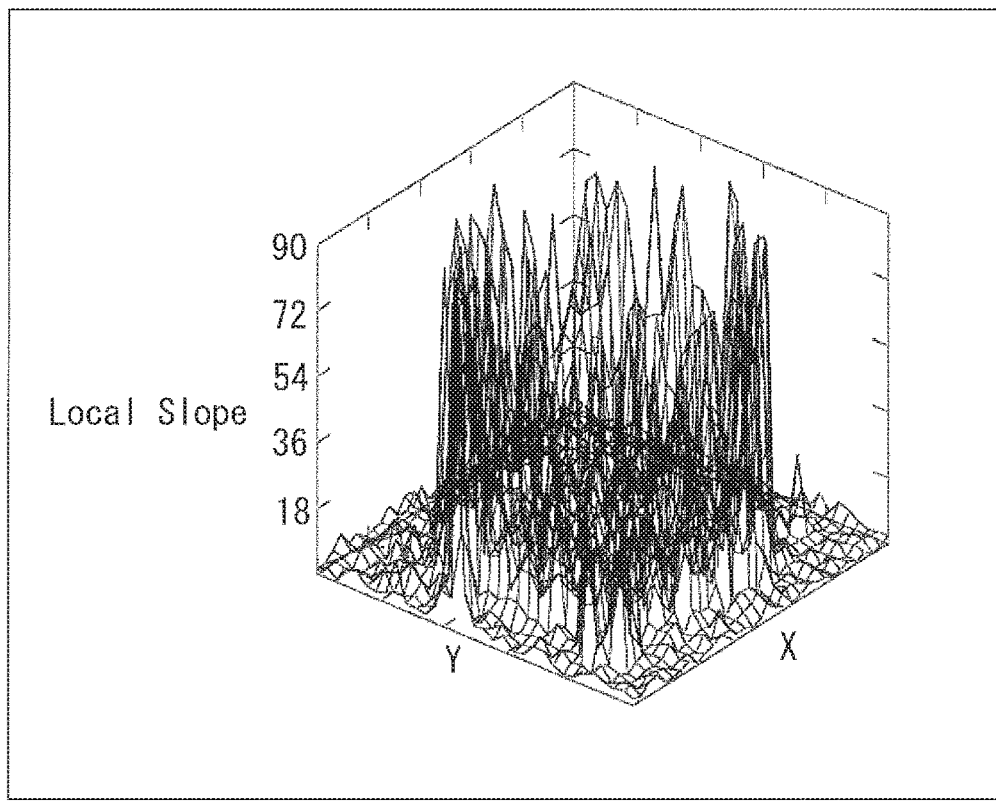
FIG. 9B is a diagram for explaining the method for calculating a score on the basis of an estimated height.

FIGS. 9A to 9C are diagrams for explaining a method for calculating a score on the basis of an estimated height. Of those, FIG. 9A is an enlarged schematic view of a portion of a distribution of data on an estimated height. In the figure, a pixel to be evaluated is represented by a black circle. The pixel to be evaluated is hereinafter referred to as a concerned pixel. Then, a pixel to which the distance from the concerned pixel is within a predetermined range is referred to as a vicinity pixel, and in this example, it is assumed that a pixel to which the distance from the concerned pixel is less than or equal to two pixels is a vicinity pixel.

In order to calculate a score on the basis of an estimated height, first, an approximate plane is obtained from pieces of data on the estimated heights of the concerned pixel and the vicinity pixel. Then, a local slope angle of the concerned pixel is obtained from an angle at which a normal vector of the obtained approximate plane and a Z axis intersect. For example, a least-square method is used for calculating the approximate plane.

FIG. 9B illustrates an example of obtaining a local slope angle with respect to an estimated height of FIG. 4. When using an optical measurement apparatus that performs measurement by use of the reflected light of the light with which the specimen 3 is irradiated, the amount of light of the reflected light is smaller if the slope of the surface of the specimen 3 is steeper, with the result that it becomes difficult to perform the measurement. Therefore, while data on an estimated height is determined to be highly reliable when a slope angle obtained with respect to the estimated height is sufficiently small, the height data is expected to be less reliable if the slope angle is larger. Then, a score calculating table of a local slope angle obtained from an estimated height is set on the basis of such a relationship between the local slope angle and the reliability of the data.

FIG. 9C illustrates an example of a score calculating table in which a local slope angle is associated with its evaluation value. As is the case in the score calculating tables described above, in the score calculating table, the score has a value greater than or equal to zero and less than or equal to one, and the score calculating table is set such that the score is smaller if the slope angle is larger. The score obtained from a score distribution on the basis of a local slope angle obtained from an estimated height in FIG. 9C is hereinafter referred to as a "local slope angle score".

The range of a slope angle varies depending on the measurement apparatus or the measurement conditions. Thus, a plurality of local slope angle scores are provided and stored in the storage 22 in advance, so that an appropriate score calculating table can be selectively used according to the measurement apparatus or the measurement conditions.

The score calculating table of a local slope angle is also not limited to the score distribution illustrated in FIG. 9. The score calculating table may have another score distribution that curves such that the score is larger if the local slope angle is smaller and is smaller if the local slope angle is larger, for example, like a quadratic curve.

In the present embodiment, the calculation processor19 evaluates measurement data by use of at least one of the various scores described above. The evaluation is preferably performed by use of two or more different types of scores. As an example, a method for performing evaluation by use of all the scores described above will be described with reference to FIG. 10.

FIG. 10 is a diagram for explaining a method for evaluating measurement data by use of the scores described above.

FIG. 10 illustrates a distribution of values obtained by performing multiplication of "intensity score", "full-width-at-half-maximum score", "residual score", "peak position score", and "local slope angle score" described above for each measurement point, that is, for each pixel. The evaluation value obtained from a plurality of types of scores is hereinafter referred to as a "total score", and each score, for example, an "intensity score", which is used for calculating a total score, is referred to as a "score element".

As described above, a value of each score element is closer to one if the data is more reliable and is closer to zero if the data is less reliable. Thus, a total score obtained by performing multiplication of the values of score elements is also higher if the data is more reliable, wherein the maximum score is "one" and the minimum score is "zero". As seen from above, the total score is an index for comprehensively determining the reliability of measurement data from various aspects.

In the example, a total score is calculated by use of all the score elements that have been described with reference to FIG. 5 to FIGS. 9A to 9C, but it is not limited to this. For example, some of the score elements may be optionally selected from the different types of score elements described above, so as to calculate a total score by use of them. In any case, at least a score element related to intensity of pixel (an intensity score) and a score element related to a slope (a local slope angle score) are preferably used for calculating a total score. Incorrect measurement data can be determined with a high accuracy by evaluating measurement data from a viewpoint of intensity and a local slope angle.

The calculation processor 19 compares a total score with a predetermined threshold, and determines that a pixel is less reliable data when the total score of the pixel is less than or equal to the predetermined threshold. The calculation processor 19 performs invalidation on the pixel that has been determined to be less reliable data and displays a measurement result on the display 21.

Figure 11B:
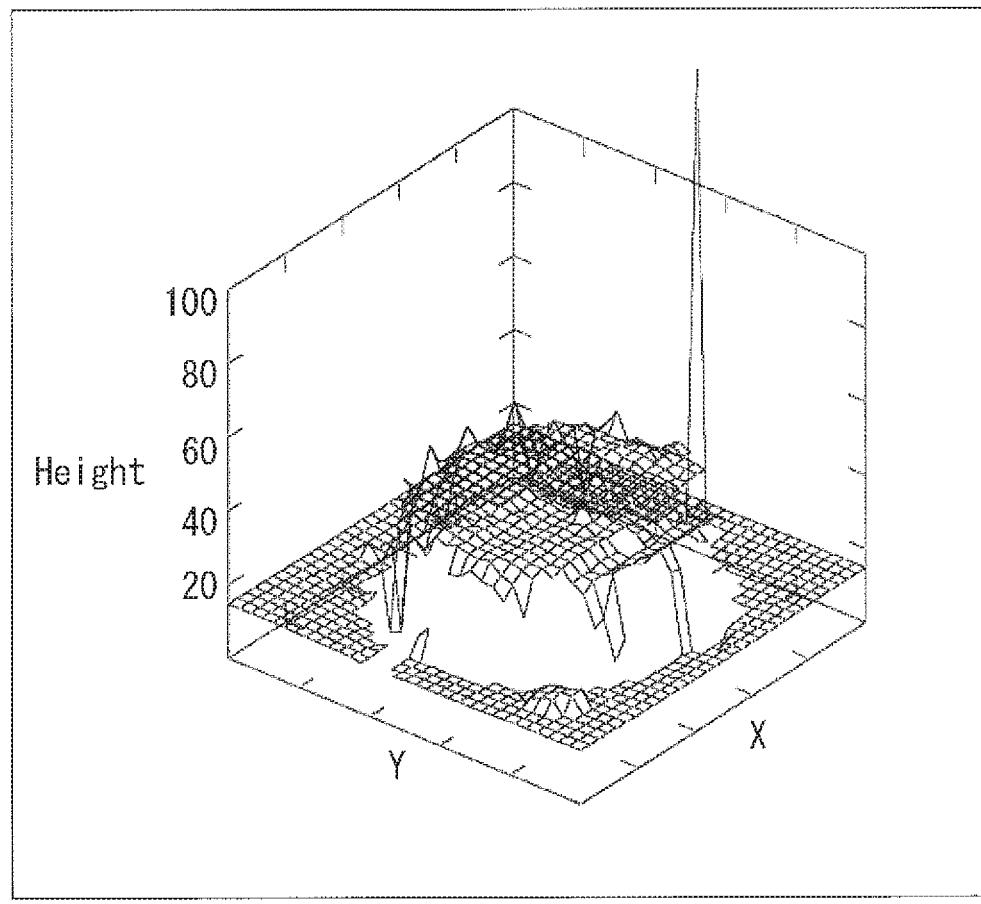
FIG. 11B is a bird's eye view of a height data distribution when invalidating less reliable data on the basis of a calculated total score.
Figure 13B:
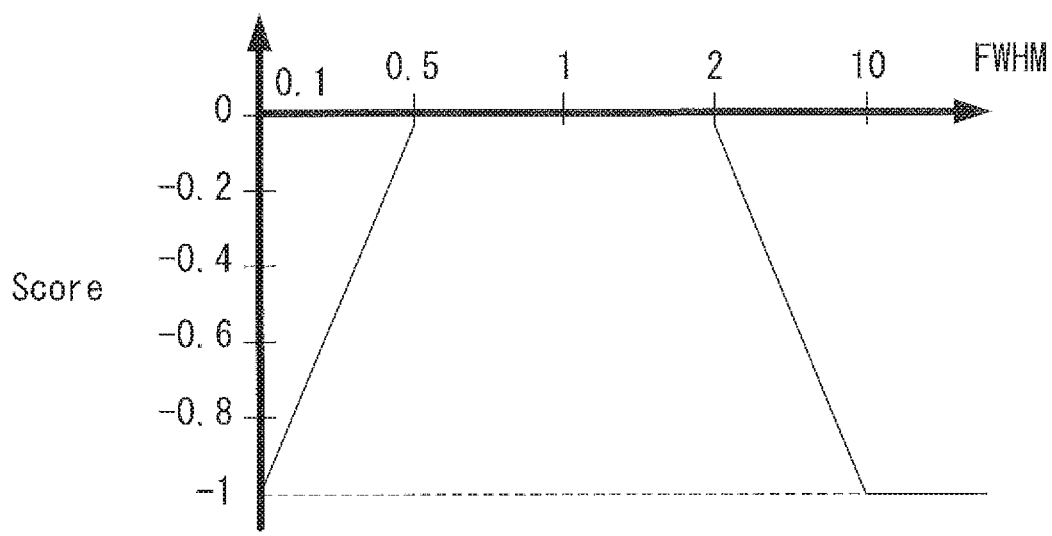
FIG. 13B illustrates the value to be assigned to each score calculating table according to the modification.
Figure 13D:
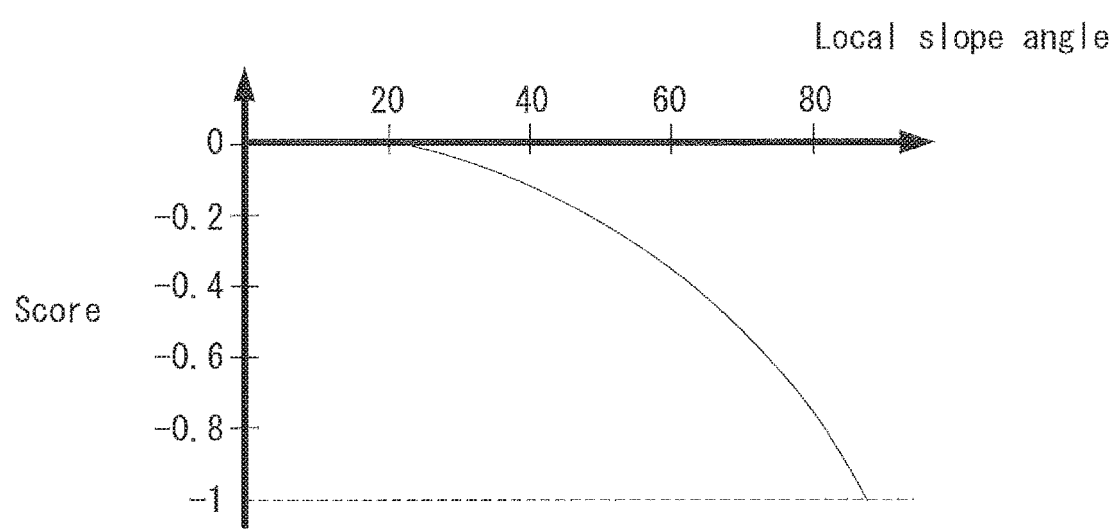
FIG. 13D illustrates the value to be assigned to each score calculating table according to the modification.

FIGS. 11A to 11C are bird's eye views of a height data distribution when invalidating less reliable data on the basis of a calculated total score. FIGS. 11A to 11C illustrate valid height data distributions when thresholds are set to 0.02, 0.10, and 0.16, respectively, with respect to the distribution of data on an estimated height in FIG. 4.

Compared to the case of FIG. 11A in which the threshold is set to 0.02, when the threshold is set relatively high to 0.10 as illustrated in FIG. 11B, there is still incorrect measurement data left even though some of the pieces of obviously incorrect measurement data with a spiky point that exist in FIG. 11A have been invalidated. Further, when the threshold is set relatively high to 0.16 as illustrated in FIG. 11C, the pieces of obviously incorrect measurement data with a spiky point have been nearly invalidated and have disappeared from the height data distribution. As described above, if a threshold is appropriately set, it is possible to exclude incorrect measurement data from measurement data to provide it to a user for analysis.

As a set value for a threshold, an optimal recommended standard value (a default threshold) is preset by a measurement apparatus manufacturer for each measurement condition. However, the measurement apparatus may have a configuration in which a user of the measurement apparatus adjusts the threshold checking the data to find out how a determination result of measurement data varies according ta a change in the threshold, for example, as illustrated in FIGS. 11A to 11C. When the user refers to the determination result to change the setting of a threshold, a histogram of a total score may be displayed as ancillary information.

Further, with respect to the data determined to be invalid due to its low reliability, the distribution may be displayed in a state in which the data is deleted, as illustrated in FIGS. 11A to 11C, or may be displayed in a state in which the data is colored with a specific color representing invalid data (for example, black). Any other display method is acceptable when the form displayed on the display 21 permits the user to easily identify the location of the data determined to be invalid.

The pixel determined to be invalid may be subjected to data interpolation by use of the height values of valid pixels that exist around the pixel determined to be invalid. The user is able to perform analysis using a data-interpolated result. Whether the interpolation is to be performed may be selectively configured in line with a user's intentions.

Next, a method for managing data including a total score obtained by the method described above is described.

FIG. 12 is a set of diagrams that illustrate a configuration of data managed by the three-dimensional shape measurement apparatus 100 according to the present embodiment. Of those, FIG. 12(a) illustrates a peak intensity distribution image obtained by performing an estimation by the method described with reference to, for example, FIG. 3, and this image can be used as an observation image of a microscope. FIG. 12(b) illustrates height data obtained by performing an estimation by use of the method described with reference to, for example, FIG. 3. The reliability of the height data obtained by the estimation is not determined, and the data is raw measurement data. FIG. 12(c) illustrates total score data. FIG. 12(d) illustrates a bunch of data in which information on, for example, a measurement condition such as magnification of objective, a numerical aperture, and measurement date and time is associated with the pieces of data of (a) to (c). The three-dimensional shape measurement apparatus 100 performs data management and storage for each bunch of data of FIG. 12(d).

The storage 22 of FIG. 1 and an external storage device connected to the computer 17 (not shown in FIG. 1) are examples of a destination to store the bunch of data. As an external storage device, for example, a hard disk drive or a recording medium such as a CD or a DVD is used.

When associating the information such as a measurement condition with the pieces of data of (a) to (c) and storing them, they are not necessarily combined into one electronic file. For example, each of them may be an individual electronic file, or they may be associated by use of, for example, an identification number for data.

As described above, in the three-dimensional shape measurement apparatus 100 according to the present embodiment, the calculation processor 19 calculates a score of a score element for each pixel, the pixel being a measurement point, using information obtained during a process of estimating a height for the specimen 3 or the estimated height. Each of the score elements represents the data reliability of the estimated height. The calculation processor 19 calculates a total score for each pixel on the basis of each calculated score element, and compares the obtained total score with a predetermined threshold. Then, the calculation processor 19 determines that a pixel having a total score less than or equal to the predetermined threshold is invalid, performs invalidation on the pixel, and displays a measurement result on the display 21.

As determination on whether an estimated height for each pixel is valid or invalid is performed, for example, using a recommended value preset by a measurement apparatus manufacturer as a threshold, even a beginner would not hesitate to determine whether measurement data is incorrect or correct. In other words, when measurement has been performed in an area in which the measurement limit of the three-dimensional shape measurement apparatus 100 is exceeded, or when incorrect measurement data is included that is obtained by detecting, for example, noise due to vibrations or undesired sound in an installation environment, or noise that is included in an optical detector or its amplifier circuit, an appropriate determination can be performed in such a situation. Thus, it is possible to effectively avoid performing analysis using incorrect measurement data, which results in improving the reliability of an analysis result.

Further, as described with reference to, for example, FIG. 10, in this example, a total score is calculated by use of a plurality of score elements. It is determined whether an estimated height is valid or not based on the plurality of score elements, so the accuracy of a determination of the reliability is improved, which results in suppressing the occurrence of an incorrect determination.

Further, conventionally, when determining whether height data is valid or invalid for each pixel, data calculated for the determination is often discarded in order to save memory capacity. For that reason, in order to re-determine validity or invalidity, it is necessary to change the determination conditions and to perform height measurement again from the beginning. On the other hand, in the present embodiment, as described with reference to FIG. 12, data storage and management are performed in a state in which data on an estimated height is associated with score data. Accordingly, for example, even when changing a threshold and determining the validity or invalidity of a height estimated by use of the changed threshold, it is not necessary to perform re-measurement. Thus, a user can also make fine adjustments to a threshold referring to a determination result. This results in increasing efficiency in measurement tasks because there is no need to change the determination conditions and to perform re-measurement.

With respect to processing, such as a calculation of a local slope angle, whose calculation load is large, a calculation is performed in the computer 17 connected to the three-dimensional shape measurement apparatus 100 when data is obtained for height measurement. Thus, even when reading, by another computer with a lower calculation performance, a total score obtained from a calculation with a large load and data on an estimated height, so as to perform analysis, a user can perform manipulation without stress. This is effective especially if a computer that is not connected to a measurement apparatus is desired to be used when performing analysis by use of already obtained data because the analysis can be performed by installing software for analysis in the computer.

<Modification 1>

In the first embodiment described above, a value greater than or equal to zero and less than or equal to one is assigned to a score calculating table, as illustrated in FIG. 5(*d*), FIG. 6(*d*), FIG. 7(*d*), or FIG. 9C, so as to calculate a score from this. Then, a multiplication of the respective calculated score elements is performed so as to calculate a total score having a value greater than or equal to zero and less than or equal to one, as illustrated in FIG. 10. However, the method for calculating a score element or a total score is not limited to this.

For example, a range of a value to be assigned to each score calculating table may be greater than or equal to zero and less than or equal to one hundred. This results in evaluating the reliability of measurement data in more detail. Alternatively, as illustrated in FIGS. 13A to 13D, the range of a value to be assigned to each score calculating table may be greater than or equal to minus one and less than or equal to zero, so as to calculate the total score by adding the score elements obtained from the respective score calculating tables. The total score can be used as an index for comprehensively determining the reliability of measurement data, as is the case with a total score obtained by a multiplication of score elements. In a calculation of a total score, addition and multiplication may exist in a mixed manner, or addition or multiplication may be performed after each score element is weighted. This is effective, for example, when a value of a specific score element is desired to be given importance for an evaluation.

Further, the total score is not limited to the case in which the values of a score element are sequential, and the values that are scores of a small number of digital bits such as 4, 8, or 16 grayscales may be discretized. A data storage capacity can be made smaller when storing discrete values.

<Modification 2>

In the first embodiment above, an estimation of the height of the specimen 3 by use of the confocal microscopy is described as an example, but the embodiment is not limited to this. For example, a height estimation by use of the coherence scanning interferometry is also applicable.

By the confocal microscopy, an approximated curve is calculated from a change in intensity as illustrated in FIG. 3 and a peak intensity value and a Z position are estimated from the approximated curve, so as to obtain a score element by use of information obtained during an estimation process and an estimated height. This has been already described in the first embodiment. A method for calculating a score element when performing three-dimensional shape measurement by use of coherence scanning interferometry will now be described.

First, a method for measuring a three-dimensional shape of the specimen 3 by use of the coherence scanning interferometry will be described.

In the coherence scanning interferometry, light emitted from a low coherence source such as halogen light or LED (light emitting diode) light is branched by, for example, a beam splitter. One of the beams of light obtained by branching the light is collected by an objective on the surface of the specimen 3, and the other is collected on a reference mirror. When coupling again the beam of light reflected onto the surface of the specimen 3 and the beam of light reflected onto the reference mirror, an interference pattern of a light wave is created. The interference pattern is captured by use of an image pickup device such as a CCD (charge coupled device) or a CMOS (complementary metal oxide semiconductor). In this case, low coherence light is used as a light source, so an interference pattern only appears when the difference in length of light path between the reflected beam of light from the surface of the specimen 3 and the reflected beam of light from the reference mirror is small, for example when the difference is about a few micrometers. When the lengths of light paths are identical to each other, that is, the distance to the specimen 3 and the distance to the reference mirror are identical to each other, the interference intensity is highest.

When measuring a three-dimensional shape of the specimen 3 by use of the coherence scanning interferometry, the shortness of a coherence length is used. In other words, interference images are sequentially captured by changing the relative distance between the objective and the specimen 3. Then, the three-dimensional shape of the specimen 3 is measured by estimating, at each measurement point (each pixel position) of an interference image, a maximum value of a change in intensity (a peak intensity value) and a Z position that gives the peak intensity value, that is, a position in which a difference in length of light path is zero.

FIG. 14 is a diagram for explaining a method for estimating a peak intensity value and a Z position in a measurement point by the coherence scanning interferometry.

As illustrated in FIG. 14, in the coherence scanning interferometry, an intensity-change curve has a vibration waveform called an interferogram. The calculation processor 19 of the computer 17 estimates a peak intensity value and a Z position from an envelope curve of the vibration waveform.

As described above, also in the coherence scanning interferometry, a peak intensity value is also estimated during a process of estimating a height. An intensity score can be calculated by use of the estimated peak intensity value, as is the case with the foregoing method. In addition to the intensity score, for example a full-width-at-half-maximum score and a local slope angle score can also be calculated when measuring a three-dimensional shape by use of the coherence scanning interferometry. If a total score is calculated by use of these score elements, the reliability of an estimated height can be determined, which provides the same advantage as that in the first embodiment.

<Second Embodiment>

In the present embodiment, stitching processing is performed by use of data obtained by the method according to the first embodiment.

In this case, the stitching processing refers to processing that includes dividing a desired measurement area into several small areas so as to perform measurement on the small areas, and joining the individual pieces of measurement data so as to obtain one piece of measurement data, because the range which the three-dimensional shape measurement apparatus 100 is able to measure at a single time is limited.

A method for performing the stitching processing according to the present embodiment will be described below with reference to FIGS. 15 to 17. The configuration of the three-dimensional shape measurement apparatus 100 and each operation related to the determination of the reliability of data are the same as those in the first embodiment, so their description will be omitted.

Figure 16:
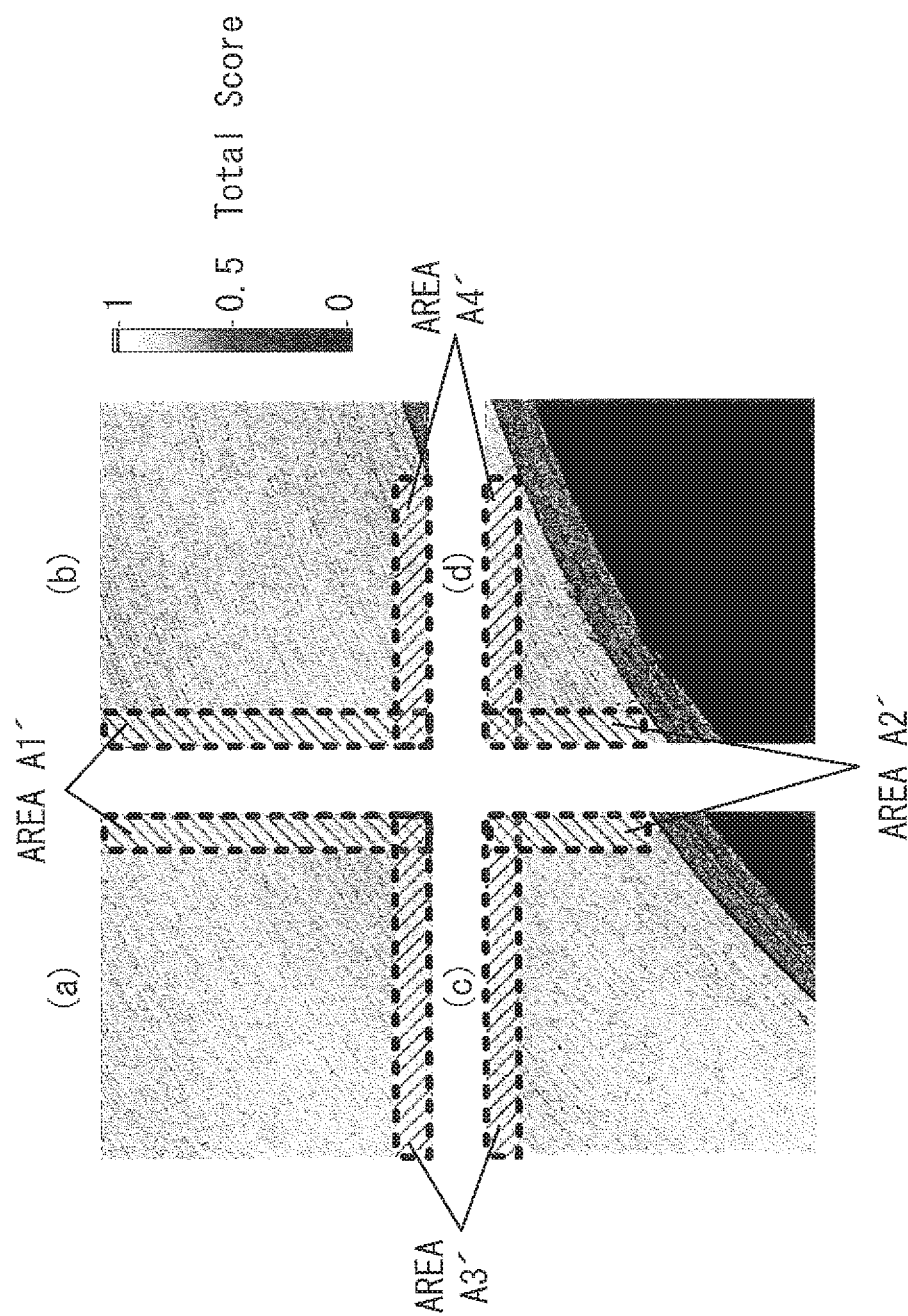
FIG. 16 illustrates a total score image that corresponds to FIG. 15.
Figure 17:
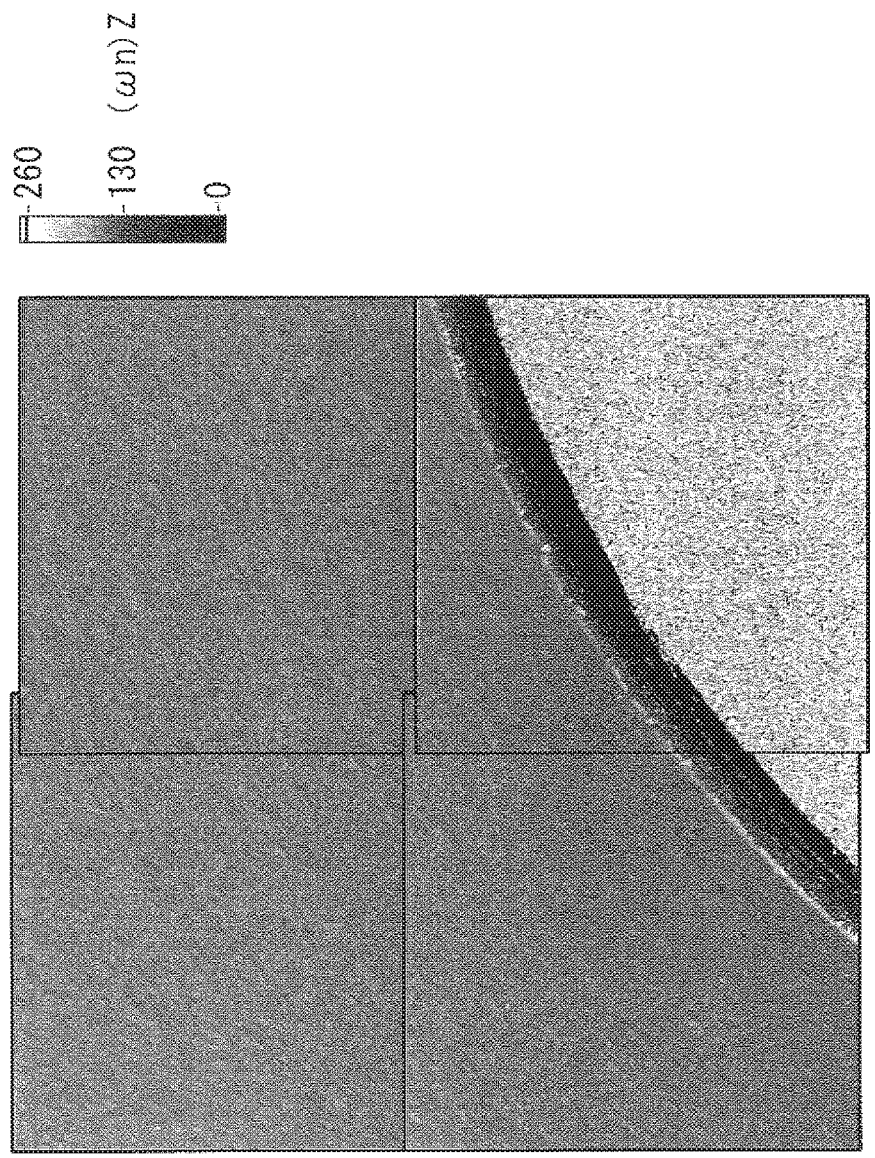
FIG. 17 illustrates an example of a stitching image created by the three-dimensional shape measurement apparatus according to a second embodiment of the present invention.

FIG. 15 illustrates an estimated image of height obtained by measuring a three-dimensional shape, and FIG. 16 illustrates a total score image that corresponds to FIG. 15.

(a) to (d) of FIG. 15 are height images which the three-dimensional shape measurement apparatus 100 has estimated from a peak intensity distribution image of the specimen 3 by the method described above. Overlapping areas A1 to A4 are provided between the images of (a) to (d). One image is created by joining in place the overlapping areas of the images of (a) to (d) that are respectively adjacent. However, in the example of FIG. 15, in the images (a) to (d), the images (c) and (d) each have a portion in which the specimen 3 does not exist.

(a) to (d) of FIG. 16 are total score images that correspond to (a) to (d) of FIG. 15, respectively. A total score having a value greater than or equal to zero and less than or equal to one is represented by gradation, and a higher score is represented by a lighter color.

As illustrated in FIG. 16, a value of the total score is smaller in the portions of (c) and (d) in which the specimen 3 does not exist. The reason is that the values of score elements, including an intensity score, a full-width-at-half-maximum score, and a residual score, which are the basis for calculating a total score, are smaller in the portion in which the specimen 3 does not exist.

In the present embodiment, in the total score images of FIG. 16, the calculation processor 19 of the computer 17 extracts, from the areas A1 to A4 of FIG. 15 for joining the images, areas A1' to A4' each having a total score not less than a predetermined threshold. In FIG. 16, the areas surrounded by a dashed line correspond to the areas A1' to A4'. The calculation processor 19 excludes an area having a total score less than the predetermined threshold from the areas to be extracted and does not use it for stitching, and performs the stitching processing by use of the extracted areas A1' to A4'.

In the stitching processing, an optimal joining position is determined such that the pieces of height data in the positions corresponding to the areas A1' to A4' are most consistent between the adjacent images, that is, (a) and (b), (c) and (d), (a) and (c), and (b) and (d) in FIG. 15. In general, the optimal joining position is estimated by performing a cross-correlation operation. However, the position may be determined such that the difference is smallest, by comparing the overlapping areas. As described above, the method for estimating an optimal position for joining images is not limited to the example, and various methods may be employed. FIG. 17 illustrates an example of a stitching image created by the three-dimensional shape measurement apparatus 100 according to the present embodiment.

As described above, the three-dimensional shape measurement apparatus 100 according to the present embodiment permits the determination of an optimal position for joining images upon a stitching of images, using only data that is highly reliable to some extent, and without using data of a less reliable area. This results in reducing incorrect stitching processing. Further, there exists score data for each image to be joined, so the stitching processing can be performed again by changing a threshold used for determining a total score even when an error occurs in the stitching processing.

Conventionally, when there exists data that is suspected to be affected by, for example, erroneously detected data or noise in the overlapping areas of images (the areas A1 to A4 in the example of FIG. 15), it is difficult to perform correct stitching processing. When joining a plurality of images, the images to be joined next after certain images are joined will be joined offset from a correct spatial position. Thus, once an error has occurred in the stitching processing, the image joining is not allowed to be performed after that, and then there is a need to restart the processing from measurement.

On the other hand, using the three-dimensional shape measurement apparatus 100 according to the present embodiment, there is no need to restart the measurement itself from the beginning even when there is an error in the stitching processing, which results in performing image joining tasks efficiently.

The present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

What is claimed is:

1. A three-dimensional shape measurement apparatus that measures a three-dimensional shape of a specimen in a non-contacting manner, the three-dimensional shape measurement apparatus comprising:
    a confocal microscope that irradiates the specimen with light emitted from a laser source and that generates a plurality of confocal microscope images based on intensity values of light reflected from the specimen; and
    a processor that is configured to:
    perform a process for estimating a height of each of a plurality of measurement points on the specimen based on the intensity values of light reflected from the specimen in the plurality of confocal microscope images,
    calculate, for each of the measurement points, (i) a first score based on information on the intensity values, (ii) a second score based on the estimated height of the measurement point, and (iii) one total score from at least the calculated first score and the calculated second score, for evaluating the reliability of measurement data;
    evaluate the reliability of the measurement data for each measurement point, based on the calculated total score for the measurement point; and
    process the measurement data according to a result of evaluating the measurement data for each of the measurement points by use of the total score to generate a height data distribution image of the specimen based on the processed measurement data,
    wherein, in processing the measurement data to generate the height data distribution image, the processor at least one of (i) deletes measurement data determined to be invalid based on the result of the evaluation from the height data distribution image, (ii) generates the height data distribution image such that the measurement data determined to be invalid is displayed in a specified color representing invalid data so as to be distinguishable from measurement data determined to be valid, and (iii) subjects pixels of the height data distribution image which correspond to measurement points whose measurement data is determined to be invalid to data interpolation based on measurement data determined to be valid of measurement points around the measurement point whose measurement data is determined to be invalid.

2. The three-dimensional shape measurement apparatus according to claim 1, wherein the processor calculates the second score from a slope in the measurement point obtained from the estimated height.

3. The three-dimensional shape measurement apparatus according to claim 1, wherein the processor determines that measurement data in a measurement point is invalid if the total score of the measurement data of the measurement point is less than or equal to a preset threshold.

4. The three-dimensional shape measurement apparatus according to claim 3, wherein a recommended standard value is preset as the threshold for each measurement condition.

5. The three-dimensional shape measurement apparatus according to claim 3, wherein the threshold is variable, and the processor determines a validity or invalidity of data measured in the measurement point depending on a changed threshold.

6. The three-dimensional shape measurement apparatus according to claim 1, wherein the processor calculates an intensity score from shape characteristics of an approximated curve obtained or an approximate error, during the process of estimating the height of the specimen, by curve-approximating a change in an intensity value of a measurement point, the change being made by performing a Z-scanning, wherein the intensity score is utilizable as the first score, or as a third score in addition to the first score and the second score from which the total score is calculated.

7. The three-dimensional shape measurement apparatus according to claim 1, wherein the processor calculates, as the second score, a local slope angle score from a slope of an approximate plane of a plurality of measurement points in the vicinity of a concerned measurement point by use of the estimated height.

8. The three-dimensional shape measurement apparatus according to claim 3, further comprising a storage that stores therein at least one of information obtained during the process of estimating the height for each of the measurement points and the total score in association with the estimated height,
    wherein the processor reads the information stored in the storage, and perform processing of calculating the first score, the second score, and the total score and processing of the measurement data, based on the read information.

9. The three-dimensional shape measurement apparatus according to claim 3, wherein the processor performs stitching processing by use of data of an area having the total score not less than the threshold.

* * * * *